June 5, 1951 T. C. JONES 2,555,343
AUTOMATIC CONTROL FOR TIRE BUILDING MACHINES
Filed Feb. 9, 1949 11 Sheets-Sheet 1

INVENTOR.
THOMAS C. JONES
BY
Oberlin & Limbach
ATTORNEYS.

INVENTOR.
THOMAS C. JONES
BY
Oberlin + Limbach
ATTORNEYS.

INVENTOR.
THOMAS C. JONES
BY
Oberlin + Limbach
ATTORNEYS.

INVENTOR.
THOMAS C. JONES
BY
Oberlin & Limbach
ATTORNEYS.

June 5, 1951  T. C. JONES  2,555,343
AUTOMATIC CONTROL FOR TIRE BUILDING MACHINES
Filed Feb. 9. 1949  11 Sheets-Sheet 8

INVENTOR.
THOMAS C. JONES
BY
Oberlin & Limbach
ATTORNEYS.

INVENTOR.
THOMAS C. JONES

June 5, 1951  T. C. JONES  2,555,343
AUTOMATIC CONTROL FOR TIRE BUILDING MACHINES
Filed Feb. 9, 1949  11 Sheets-Sheet 11

ONE OF SWITCHES  ONE OF POTENTIOMETERS
4, 6, 8, 10, 12 OR 14 M S   PO1 TO PO13

INVENTOR.
THOMAS C. JONES
BY
Oberlin & Limbach
ATTORNEYS.

Patented June 5, 1951

2,555,343

UNITED STATES PATENT OFFICE 2,555,343

AUTOMATIC CONTROL FOR TIRE BUILDING MACHINES

Thomas C. Jones, Akron, Ohio, assignor to National Rubber Machinery Company, Akron, Ohio, a corporation of Ohio Application February 9, 1949, Serial No. 75,474

23 Claims. (Cl. 154—9)

The present invention relates generally as indicated to an automatic control for tire building machines and more especially to an automatic control which is operative upon tripping of a single switch to sequentially operate the tire building drum and the tools associated therewith for pre-set time periods and to interrupt operation of said drum and tools for predetermined time periods to allow the operator of the machine to start the stock on said drum and to cut and splice such stock after wrapped around said drum.

Hitherto automatic tire building machines have required either the successive tripping of switches for performing successive operations or the tripping of a single master switch for initiating operation of a timer provided with cams predeterminately tripping selected switches in accordance with the dwell of said cams. Such last-named automatic control, once set, is open to the objections that an infinite number of cams are required in order to effect time period changes in small increments; that the changing of such cams is a laborious, time consuming operation; that the difficulty of making such changes in the cams does not render it feasible to change the setting of the various operations for each shift of operators, and accordingly the operators find that because the timing of the operations of the machine does not match their individual aptitudes they are either unduly delayed in waiting for certain operations to run the pre-set periods or are rushed and put to a nervous strain on certain other operations which are set to run too rapidly to suit them.

Accordingly, this invention has for one of its primary objects the provision of an automatic tire building machine which is capable of quick, accurate, and simple adjustment in desired small increments and over a wide range of time intervals whereby to make feasible the custom adjustment of the machine at the beginning of each shift so as to suit the individual operator's particular skills.

Another object is the elimination insofar as practicable of manual operations required by the operator with respect to both the building of the tire and the control of the tire building machine.

It is another object of this invention to provide on a tire building machine a sequence timer completely controlling all of the tire building operations including uniform indexing of the rotary tire building drum thereof whereby to provide for balanced splicing of stock thereon.

It is another object to provide automatic control which, upon actuation of a foot or like manually operated switch, is operative to automatically continue through the entire tire building procedure at speeds according to pre-settings of individual operations.

Another object is to provide a control which may be interrupted at will and re-started at the place of interruption.

Another object is to provide a control which includes a manually operated reversing switch for enabling repetition of any of the tire building operations.

Another object is to provide a manually operated switch on the sequence timer which, when in one position renders the machine automatically operative through a complete tire building cycle, and when in another position renders the machine semi-automatic, in which latter case a foot or like switch must be actuated after each operation, such semi-automatic operation being particularly helpful in the training of new operators.

Another object is to provide an automatic control which is capable of quick, accurate, and simple adjustment over a wide range of time intervals and at the same time eliminates the necessity of changing or adjusting cams and the like.

Another object is to provide an automatic control device which eliminates moving mechanical parts and the serious problem of wear thereof where timing periods are relatively short and frequently repeated, save for the armature of the electromagnetic relay which is actuated by an electron tube, said device comprising an electron tube, capacitors, resistors, a magnetic relay, a transformer, and a potentiometer for varying the time delay intervals.

Another object is to provide a control which can be rendered manually operative in which case various switches are actuated to perform specific operations.

Another object is to provide an electric basic control system for a tire building machine in which individual switches are manually actuated to perform the several operations involved in the building of tires on which is adapted to be imposed either a semi-automatic control whereby successive operations may be performed by the successive actuation of a single switch, or a fully automatic electronic control whereby the tire building machine performs the entire sequence of operations upon actuation of a single switch.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail one illustrative embodiment of the invention, this being indicative, however, of but one of the various ways in which the principle of the invention may be employed.

Figure 8:
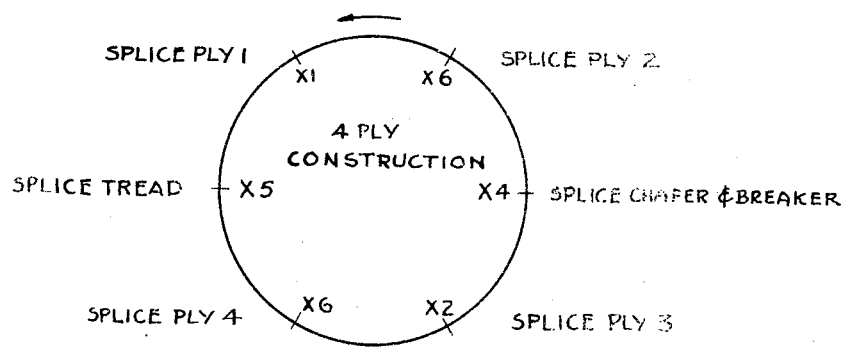
Figure 9:
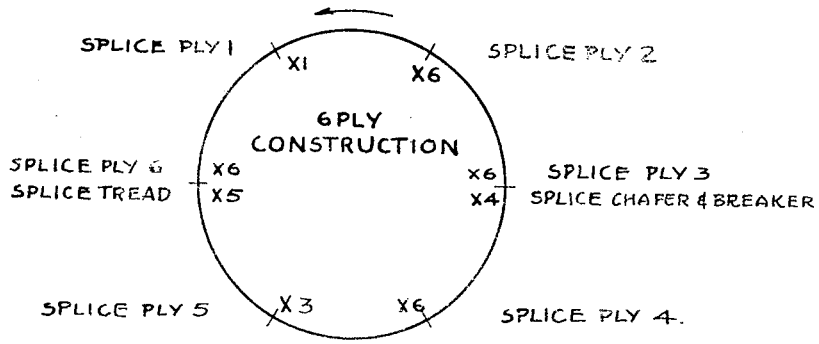
Figure 10:
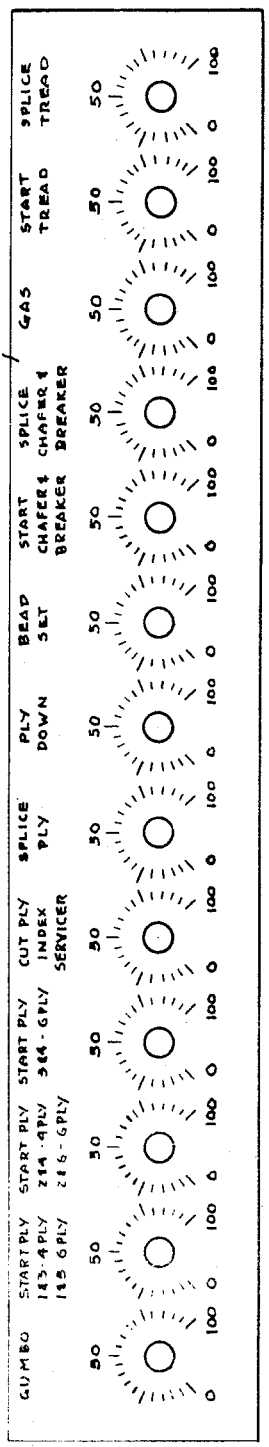
Figure 11:
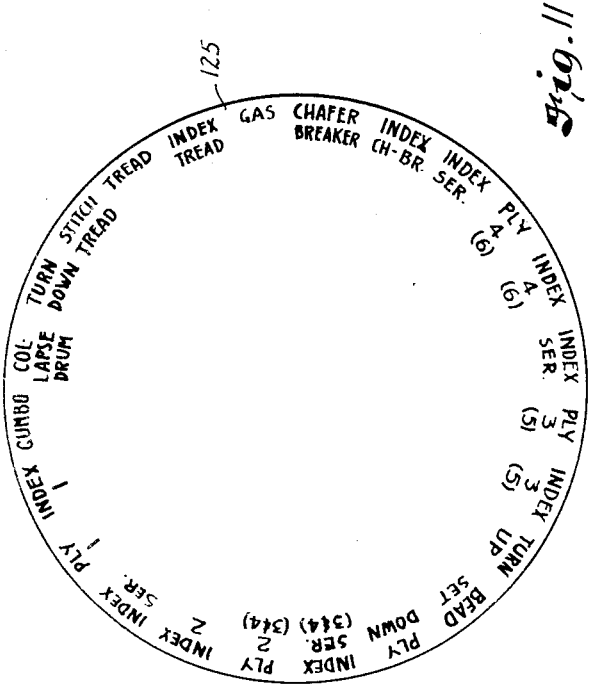
Figure 12:
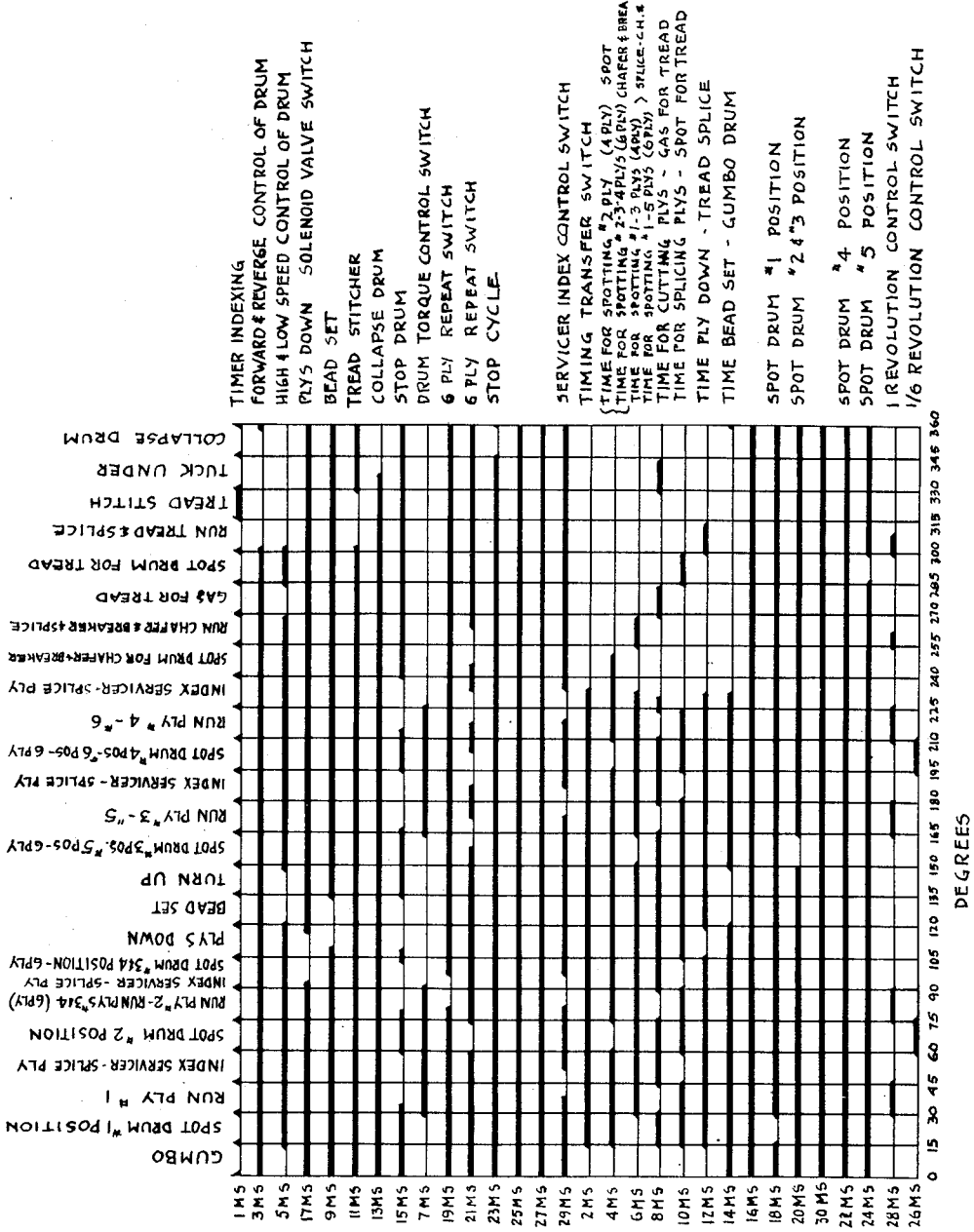
Figure 13:
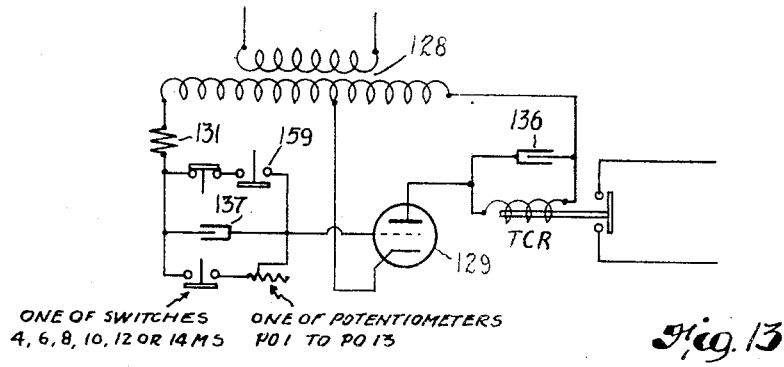
Figure 14:
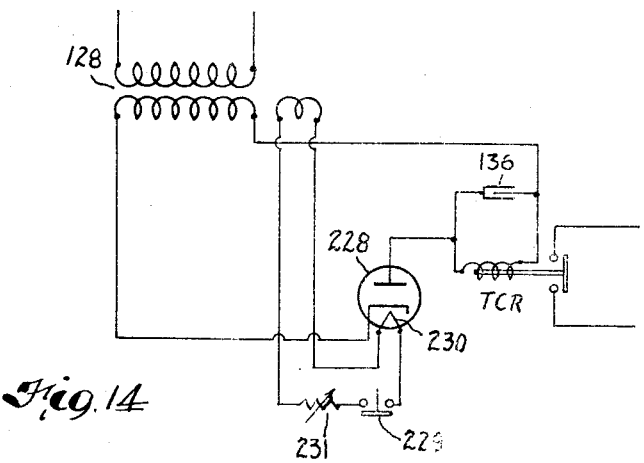
Figure 15:
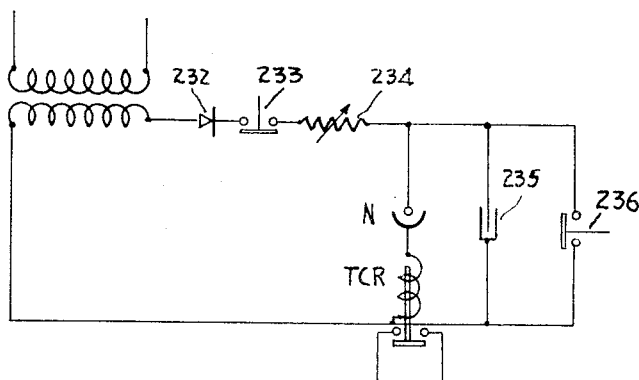

Figs. 8 and 9 respectively indicate the disposition of the drum indexing device switches for construction of four-ply and six-ply tires;

Fig. 10 is a front elevation view of the timing selector dial plate having a plurality of graduated dials thereon for selecting the timing of the various operations involved in the building of a typical tire;

Fig. 11 is an elevation view of the program controller dial which indexes from one position to the next through the entire tire building procedure;

Fig. 12 is a developed view of the cams which actuate switches controlling the various operations of the tire building machine; and Figs. 13, 14 and 15 are simplified diagrams of several time delay mechanisms which may be employed for obtaining a quick changeable control of the timed operations of the machine.

Figure 1A:
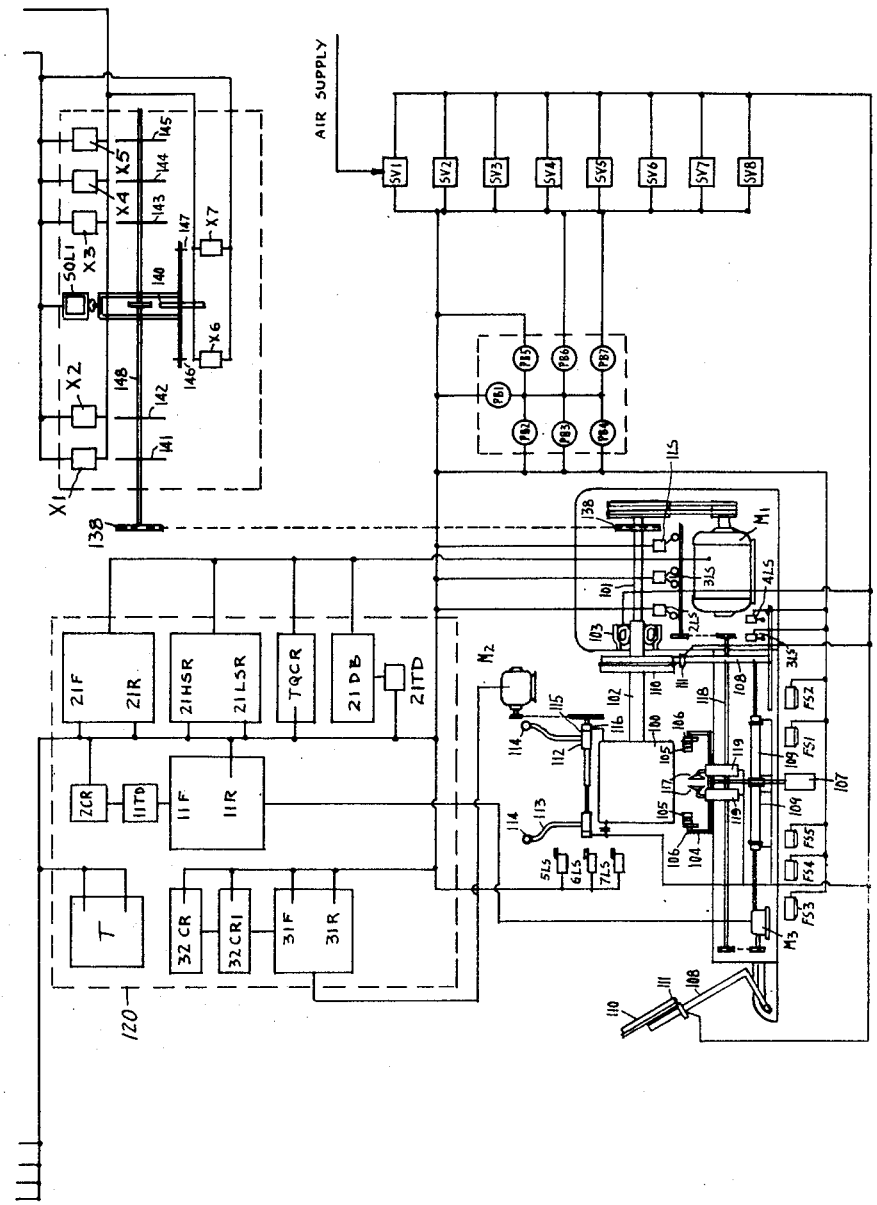
Figs. 1a and 1b are diagrammatic views of the entire tire building machine and the controls therefor, Fig. 1a illustrating the machine, the pneumatic circuit, and some of the electrical controls, and Fig. 1b illustrating the main controller, the tire building drum indexing device, the program control unit, and the automatic sequence timer.

Referring now to the drawings and first more especially to Fig. 1a thereof, the tire building machine illustrated therein is to be regarded merely as exemplary and therefore variously modifiable to correspond with particular methods of building tires. In general, the several operations involved in the building of a standard four-ply passenger car tire with the present machine as well as with other machines are as follows:

(1) Expand and rotate a collapsible tire building drum at high speed for cementing the edge thereof before applying the first ply stock, such cementing operation being referred to as "Gumbo" on the program controller dial illustrated in Fig. 11.

(2) Stop drum at predetermined position (X1, Fig. 8) for application of first ply of bias cut rubber impregnated cord fabric with the marginal edges of the ply axially overhanging the opposite ends of the tire building drum.

Figure 7:
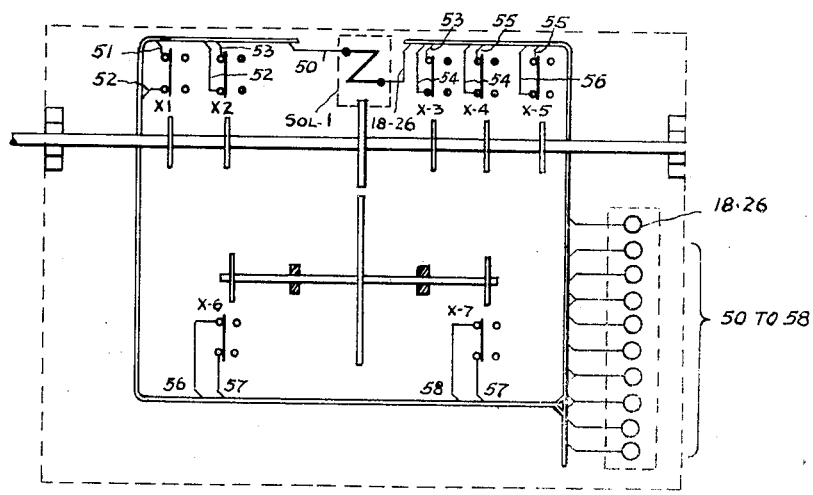
Fig. 7 is a schematic wiring diagram of the drum indexing device.

(3) Rotate drum forward one complete revolution (X7, Fig. 7) at low speed and stop to permit the operator to sever the first ply and splice the same in overlapped relation to the leading edge.

(4) Advance drum a part turn (X6, Fig. 8) and stop for application of second ply.

(5) Rotate drum forward one revolution (X7, Fig. 7) at low speed and stop to permit the operator to sever the second ply and splice the same.

(6) Rotate drum forward at low speed and actuate ply breakover or turndown tools to turn the marginal edges of the two plies radially inward against the ends of the drum into positions to receive the beads.

(7) Stop drum and retract turndown tools.

(8) Set beads with associated flipper strips against the turned down plies by means of bead setting rings and flipper stitcher tools which are movable toward the ends of the drum, the drum being rotated after the setting of the beads.

(9) Release bead setting rings and flipper stitcher tools.

(10) Rotate drum forward at high speed and turn up plies by bead stitcher turnup tools to wrap the plies aronud the beads.

(11) Stop drum at a predetermined position for application of a third ply (X2, Fig. 8).

(12) Rotate drum forward one complete revolution (X7, Fig. 7) at low speed and stop to permit the operator to sever the third ply and splice the same.

(13) Advance drum a part turn (X6, Fig. 8) and stop for application of fourth ply.

(14) Rotate drum forward one complete revolution (X7, Fig. 7) at low speed and stop to permit the operator to sever the fourth ply and splice the same.

(15) Advance drum a part turn (X4, Fig. 8) and stop for application of chafer and breaker strips.

(16) Rotate drum forward one complete revolution (X7, Fig. 7) at low speed and stop to permit the operator to cut and splice the chafer and breaker strips.

(17) Rotate drum forward at high speed while operator gases the stock, that is applies gasoline or like solvent thereunto.

(18) Stop drum at a preselected position (X5, Fig. 8) for application of tread.

(19) Rotate drum forward at low speed and stop after one revolution (X7, Fig. 7) while the operator makes the tread splice.

(20) Rotate drum in reverse at high speed and bring tread stitcher and bead stitcher turnunder tools against the tire carcass to thus complete the same except for final shaping and vulcanizing.

(21) Collapse drum to permit withdrawal of the completed tire carcass and placement of beads on bead setting rings for next tire.

The aforesaid operations are, as indicated, typical for a four-ply tire and may be variously altered as desired. In the case of six-ply tires, four plies are usually first applied and then the fifth and sixth plies are applied after the ply turnup operation 10 above. With reference to Fig. 9 the part turn advance of the drum for six-ply tires is in the following order: X1, X6, X6, X6, X3, X6, X4, X5 clockwise.

I. CONSTRUCTION OF TIRE BUILDING MACHINE (a) *The tire building drum and associated stock servicer*

The particular machine illustrated in Fig. 1a comprises a rotary tire building drum 100 of any desired expansible and collapsible construction. Said drum and drive therefor may comprise an inner shaft 101 driven in opposite directions as by a two-speed reversible electric motor M1 and a quill 102 surrounding said shaft, said shaft and quill being so formed that when the latter is braked as by the pneumatic brake 103 and said shaft rotated in a forward direction, there is effected an expansion of the drum to an operative position whereupon the shaft and quill thereafter rotate in unison to drive said drum. Conversely, with the brake 103 applied on said quill and the shaft 101 driven in a reverse direction, said drum will be collapsed so that the tire carcass built thereon may be removed as aforesaid and new beads inserted.

Associated with the drum 100 is an indexable stock servicer or turret (not shown) carrying tire building stocks thereon, the present control means, as will hereinafter appear, being operative to periodically index said servicer to bring the proper stocks and at the proper times within easy reach of the operator for application onto the tire building drum 100.

(b) Ply breakover or turndown device

Included on the machine is a ply breakover or turndown device 104 comprising ply holddown elements 105 thereon movable into contact (adjacent the ends of drum 100) with the ply wrapped therearound and turndown or breakover elements 106 movable inwardly across the opposite ends of the drum for turning down the overhanging marginal edges of the plies into position for receiving the beads. Said device 104 is preferably actuated by a pneumatic cylinder 107 as most clearly disclosed in the co-pending applications of Edwin E. Mallory et al. Serial No. 744,736, filed April 29, 1947, now Patent No. 2,529,509, and Edwin E. Mallory, Serial No. 51,093, filed September 24, 1948, now Patent No. 2,544,390; and for the purposes of the instant application it is believed unnecessary to describe the construction and operation of said device in further detail other than to indicate that it is pneumatically actuated in timed relation to other operations performed by other devices hereinafter similarly described.

(c) Bead setting ring and flipper stitcher device

Associated with drum 100 is a bead setting ring and flipper stitcher device 108 actuated as by the pneumatic cylinders 109 for first moving the bead setting rings 110 toward the ends of the drum and setting the beads carried thereon onto the previously turned down plys and then retracting said rings away from the ends of the drum and concurrently moving the pneumatically actuated flipper stitcher tools 111 against the flexible strips of the beads to thus firmly press said strips against the plies. One form of bead setting device is fully described in the co-pending application of Mallory et al., Serial No. 760,034, filed July 10, 1947, now Patent No. 2,500,193.

(d) Bead stitcher or underply turnup and overply turndown device

This device denoted generally by the numeral 112 comprises a pair of arms 113 carrying tools 114 at the ends thereof which tools are adapted to be moved from the inside to the outside of the drum to turn up the underply around the previously set beads and then later from the outside to the inside of the drum to turn under the overply which is applied to the drum after such underply turnup operation, said tools being so moved by rotation of the arms 113 in opposite directions about their own axes as by the reversible electric motor M2 and suitable gearing in the arm mounting structure 115.

Said tools 114 during their movement as aforesaid are yieldably urged into engagement with the plies by pressure applied through the pneumatic cylinders 116.

A fuller explanation of one form of bead stitcher device will be found in the copending application of Florian J. Shook et al., Serial No. 749,276, filed May 20, 1947, now Patent No. 2,488,340.

(e) Tread stitcher device

This device comprises rollers or disks 117 engageable with the tread applied on drum 100 and movable toward and away from one another in a direction parallel with the axis of rotation of the drum as by rotation of the shaft 118 in opposite directions as by reversible electric motor M3, said shaft having lefthand threads at one end engaged with one of the roller supports 119 and right hand threads on the other end engaged with the other of the roller supports 119. The supports 119 are further in the form of pneumatic cylinders which when actuated serve to move the rollers 117 into yieldable pressing engagement with the tread on the drum 100.

From the outline of the typical steps involved in the building of a tire and from the brief description of the various devices associated with the tire building drum it is now evident that it would greatly facilitate the building of the tire if such operations and devices were correlated so as not only to be automatically operable but further readily adjustable to suit the particular aptitudes of each operator. It is this problem of automatic control and simplicity of adjustment which is solved by the present invention in a most efficacious manner as will be discussed in detail.

II. CONTROL ELEMENTS AND THEIR FUNCTIONS

Figure 1B:
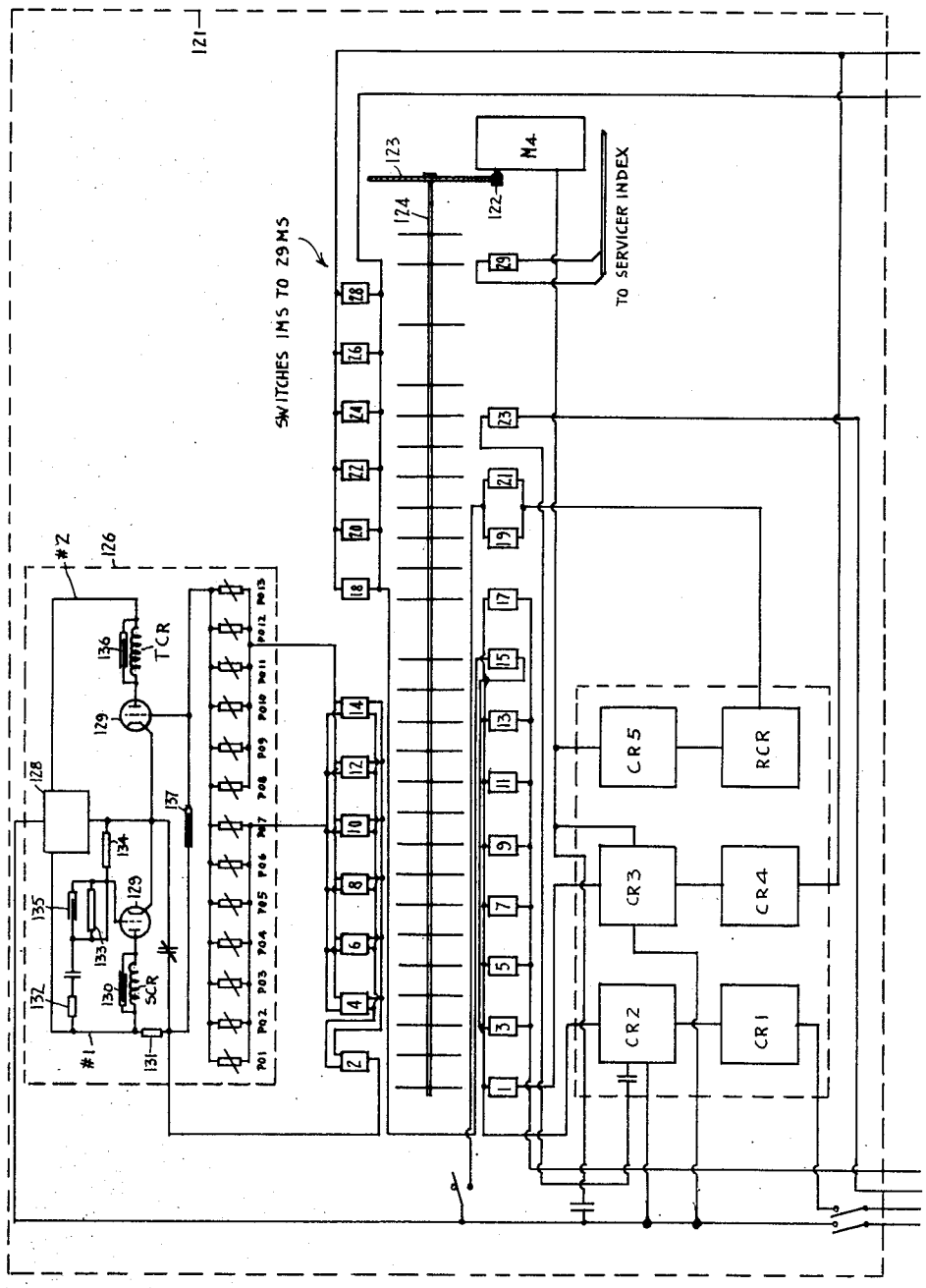

Before tracing the detail circuits through which automatic control of the tire building machine is effected, reference will be made to the control elements generally, as shown in Figs. 1a and 1b.

(a) Electric motors (not including M4 in sequence timer)

As described above, the tire building machine includes electric motors M1, M2, and M3. By way of elaboration, M1 is preferably a two-speed (900 and 450 R. P. M.) reversible 2½ H. P. A. C. motor for driving the tire building drum 100; M2 is a ½ H. P. reversible D. C. motor for driving the bead stitcher device 112; and M3 is a ⅓ H. P. reversible A. C. motor for driving the tread stitcher device 117.

(b) Magnetic auxiliary power devices

These devices comprise solenoid operated air valves SV1 through SV8 for controlling the supply of air from any suitable source to the pneumatic cylinders associated with the tire building machine. SV1 actuates the cylinder 107 associated with the ply breakover device 104; SV2 actuates the cylinders 109 for moving the bead setting rings 110 against the drum 100; SV3 and SV4 respectively supply high pressure and low pressure air to the pneumatic cylinders 119 for positioning the tread stitcher rolls 117 against the tread selectively at high pressure and low pressure; SV5 and SV6 respectively supply low and high pressure air to the cylinders 116 of the bead stitcher device 112 for causing yieldable engagement between the tools 114 thereon and the plies on the drum; SV7 actuates the brake 103 to cause expansion or collapsing of drum 100 in the manner previously described, and SV8 supplies air for positioning the flipper stitcher tools 111.

(c) *The main controller*

The main controller as represented by the dotted line 120 in Fig. 1a includes the following magnetic power devices, viz. a starter 21F and 21R for rotating the motor M1 forward and in reverse respectively and thus rotating the drum 100 in opposite directions, a dynamic braking unit 21DB for applying direct current for dynamically braking the motor M1, a speed control 21 HSR and 21 LSR respectively selecting high speed and low speed operation of said motor M1, a torque control TQCR for controlling the torque, low speed of motor M1, a starter 11F and 11R for controlling forward and reverse rotation of the tread stitcher motor M3 and a starter 31F and 31R for controlling forward and reverse rotation of the bead stitcher motor M2.

Figure 2A:
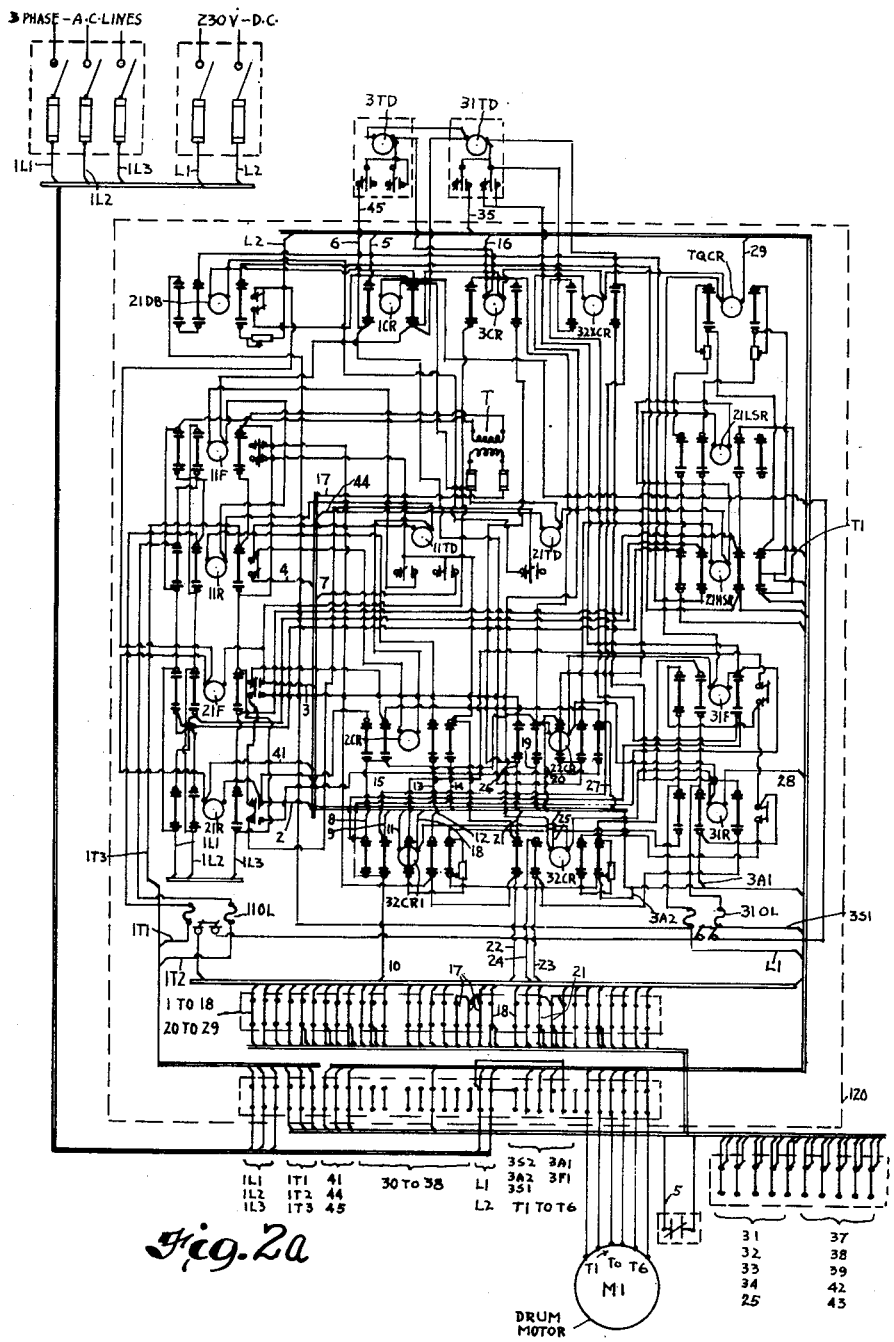
Figs. 2a and 2b are schematic diagrams of the control system omitting the details of the drum indexing device, the program control unit, and the sequence timer.
Figure 3:
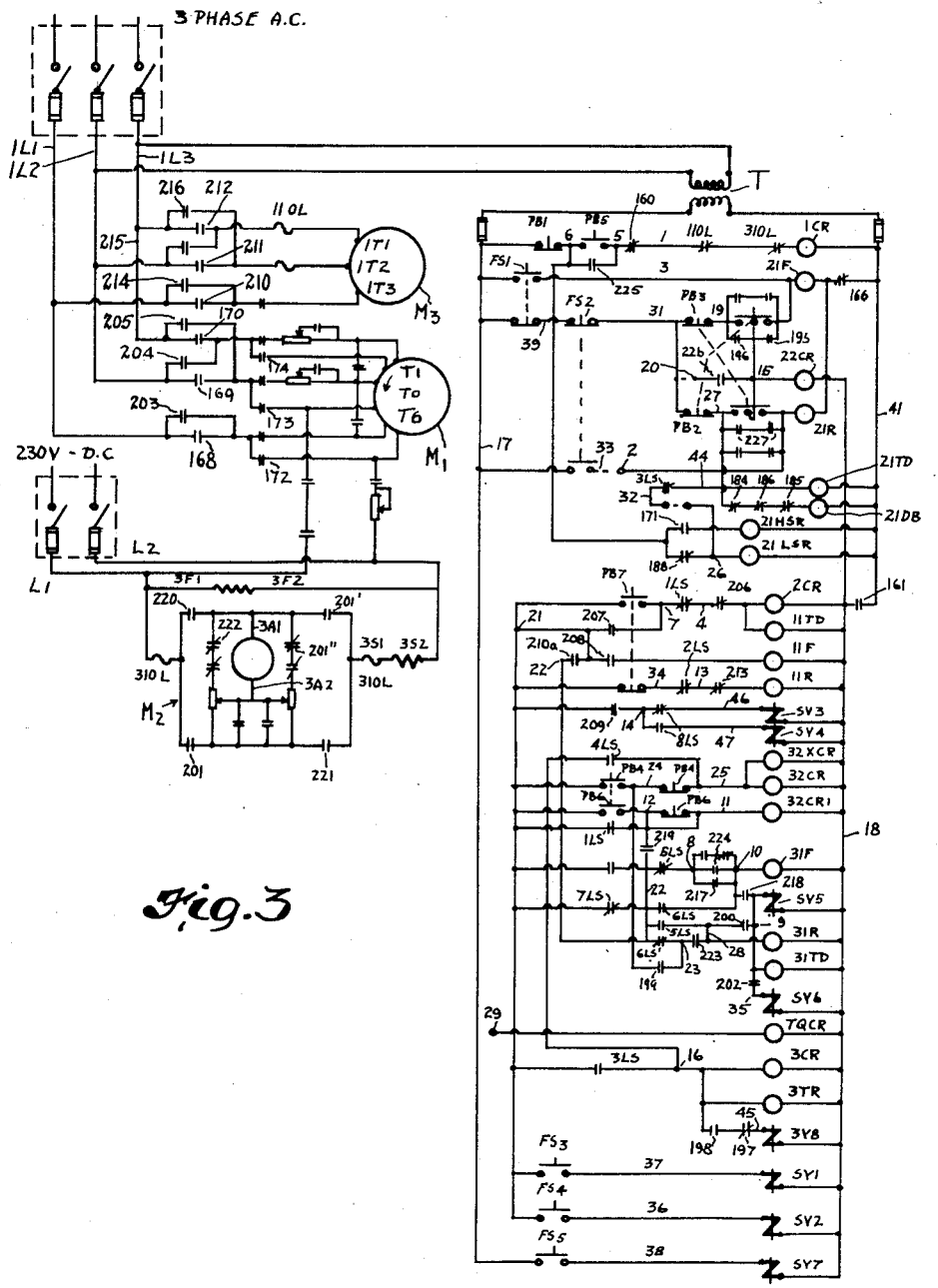
Fig. 3 is a schematic wiring diagram of the control system of Figs. 2a and 2b arranged in a manner to facilitate tracing of the circuits thereof.

Also included in the main controller as shown in Figs. 1a, 2a, and 3 are the following magnetic controlling devices or relays: 22CR to provide an inch drum interlock, 21TD to provide timing of the dynamic braking unit 21DB, 2CR to provide an electrical interlock for the magnetic power device 11R, 11TD for energizing the solenoid air valve SV4, 32CR for starting the ply turnup operation, 32CR1 for starting the ply turndown operation, and 31TD for energizing the solenoid air valve SV7. Other relays operating as later described are 3TD, 1CR, 3CR, and 32XCR. Said main controller 120 further includes overload devices 11OL and 31OL and a transformer T.

(d) *Manual controlling devices*

Figure 2B:
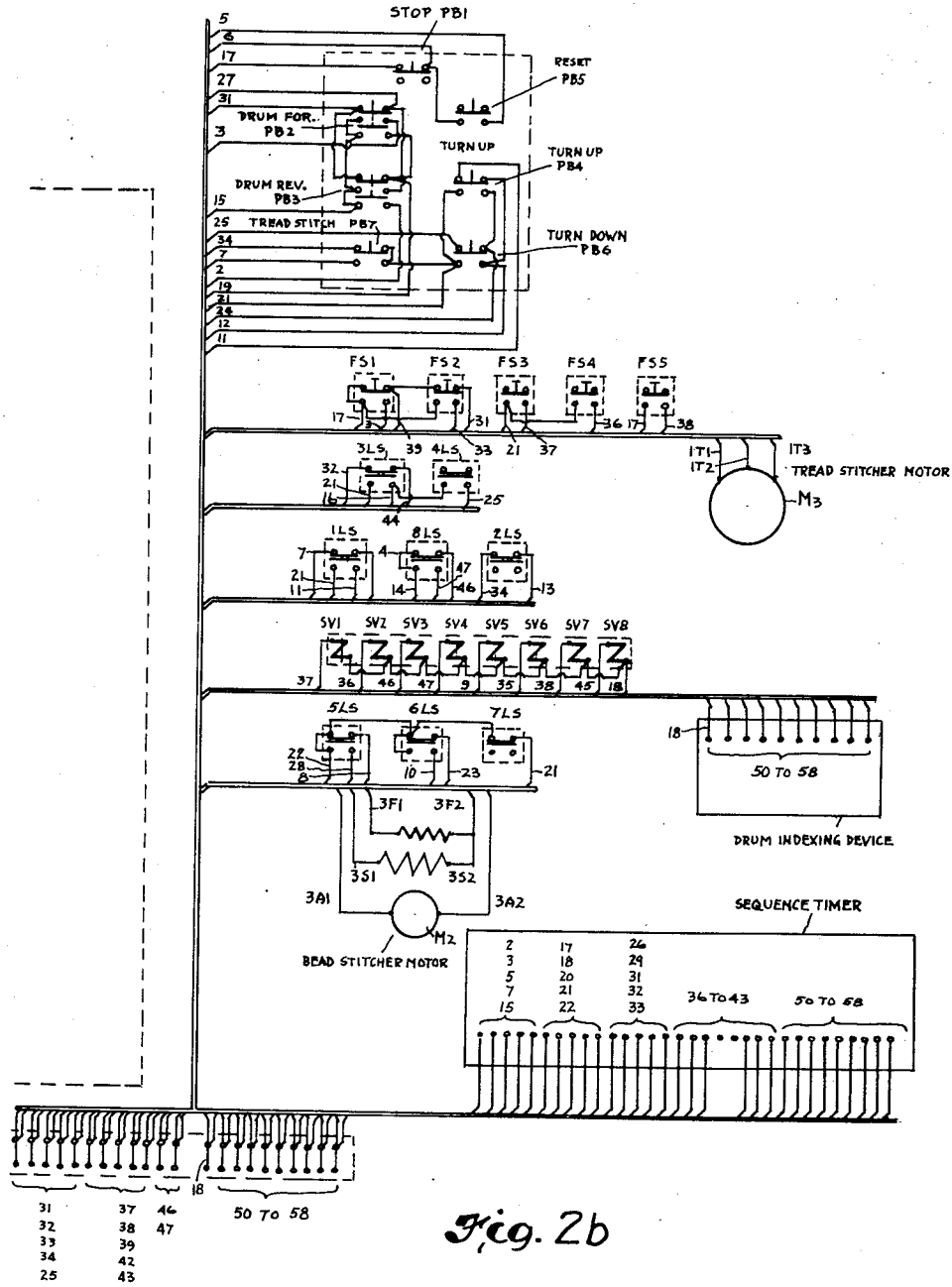

As shown in Figs. 1a, 2b, and 3, there are provided pushbuttons PB1 through PB7 and foot switches FS1 through FS5 which have the following functions: PB1 is a safety stop for the machine; PB2 is the forward drum rotation switch; PB3 is the reverse drum rotation switch; PB4 is the turnup bead stitcher switch; PB5 is the reset safety relay switch; PB6 is the turndown bead stitcher switch; PB7 is the tread stitcher switch; FS1 is the inch drum forward switch; FS2 is the inch drum reverse switch; FS3 is the ply breakover tool positioning switch; FS4 is the bead setting ring positioning switch; and FS5 is the drum expanding and collapsing switch.

(e) *Mechanically controlled devices*

As shown in Figs. 1a, 2b, and 3, the mechanically controlled devices comprise limit switches 1LS through 8LS functioning as follows: 1LS stops the tread stitcher at the end of its travel and starts the turndown stitcher; 2LS stops the tread stitcher return; 3LS starts the drum forward rotation near the in-stroke of the bead setting rings; 4LS starts the turnup bead stitcher on the out-stroke of the bead setting rings; 5LS stops the bead stitcher at the inside of the drum; 6LS stops the bead stitcher at the surface of the drum; 7LS stops the bead stitcher at its idle position; and 8LS selects the high and low air pressure on the tread stitcher.

III. THE PROGRAM CAM DRIVE UNIT

Figure 4:
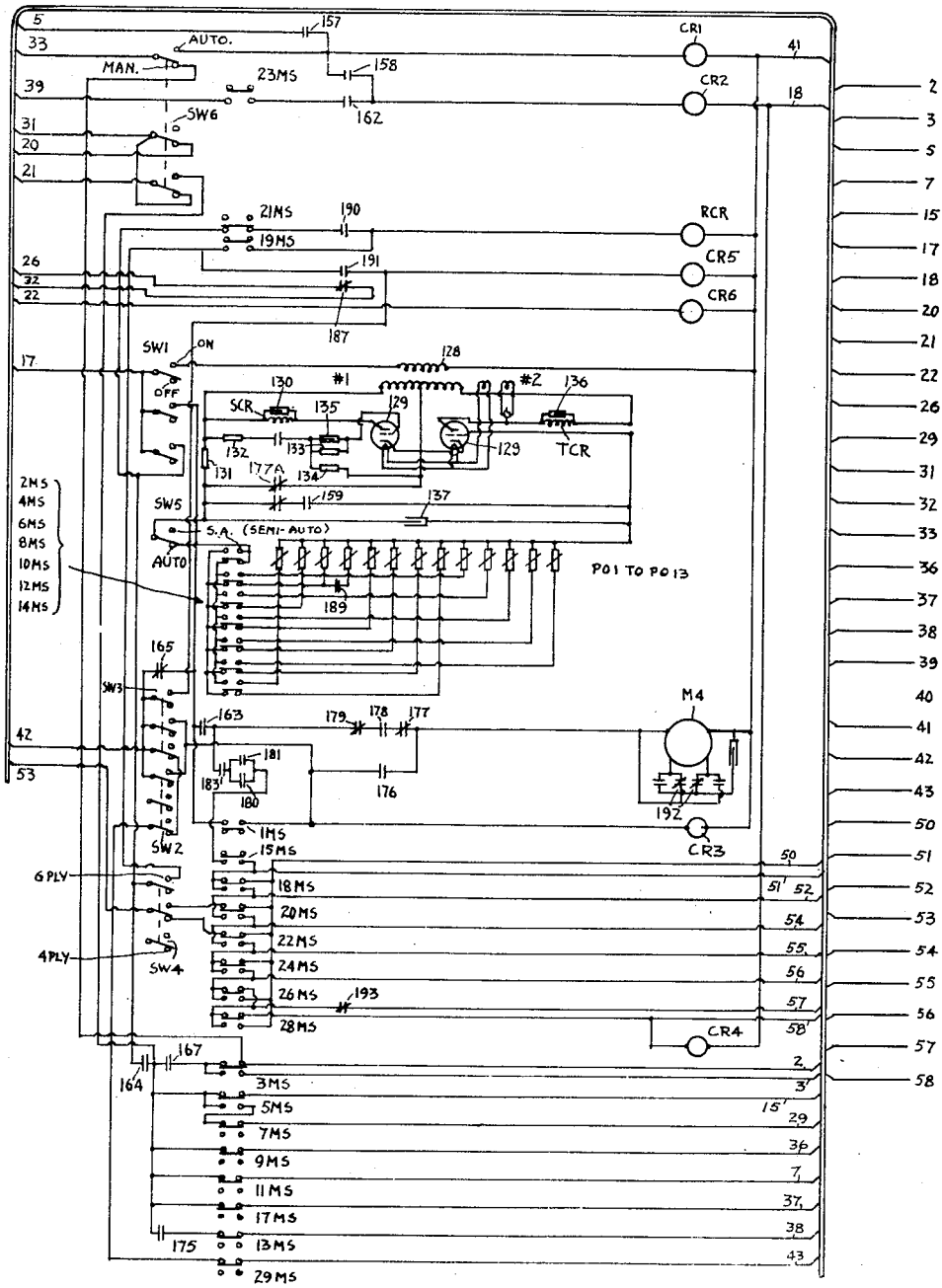
Fig. 4 is a wiring diagram of the program control unit and sequence timer with the lines thereof numbered to indicate points of connection with correspondingly numbered lines in Figs. 2a, 2b, and 3.

This unit, enclosed within the dotted line 121, Fig. 1b, and detailed in Fig. 4, is driven by a synchronous inductor motor M4 which through gearing 122 and 123 drives a cam shaft 124 (at about 1.87 R. P. M.) which accommodates up to 30 cams thereon and has 24 operating stations, as shown in Figs. 11 and 12, each cam adapted to actuate a precision switch denoted by the numbers and letters 1MS through 29MS, herein certain switches being omitted because not required.

The cam actuated switches as appearing in Figs. 1b and 4 have the following functions: 1MS is an indexing switch which energizes a relay CR3; 3MS selects forward or reverse operation of drum motor M1; 5MS selects high or low speed of drum motor M1; 7MS energizes torque control relay TQCR for motor M1; 9MS energizes solenoid air valve SV2 which actuates the bead setting rings; 11MS energizes relay 2CR and relay 11TD; 13MS energizes solenoid air valve SV7 for expanding or collapsing the drum; 15MS provides an interlock for relay CR4; 17MS energizes the solenoid air valve SV1 which positions the ply breakover tools 106; 19MS and 21MS energize a ratchet relay RCR which is a six-ply repeat switch; 23MS de-energizes relay CR2 (safety switch); 29MS energizes the stock servicer index; 2MS is a transfer switch controlling the electronic timing selections; 4MS sets up the timing selections for starting ply 2 in four-ply tires and plies 2, 3, and 4 in six-ply tires and for starting the chafer and breaker strips; 6MS sets up the timing selections for starting plies 1 and 3 in four-ply tires and plies 1, 5 and 6 in six-ply tires and for splicing the chafer and breaker strips; 8MS sets up the timing selections for cutting the plies and gassing the stock before applying the tread; 10MS sets up the timing selections for splicing the plies and starting the tread; 12MS sets up the timing selections for making the ply breakover and for tread splicing; 14MS sets up the timing selections for setting the beads and for cementing the drum before applying the stock; 18MS energizes switch X1 in the drum indexing device; 20MS energizes switches X2 or X3 in the drum indexing device; 22MS, 24MS and 26MS energize switches X4, X5 and X6 respectively in the drum indexing device, the latter being a drum advance switch; and 28MS energizes switch X7 in the drum indexing device which is the one revolution control for the drum.

The shapes of the cams on cam shaft 124 and their relation to the program selector dial 125 is illustrated in Fig. 12, said dial being adapted to be mounted on gear 123 or otherwise rendered non-rotatable on shaft 124. In Fig. 12 the associated switches 1MS et seq. and their functions are indicated.

IV. ELECTRONIC SEQUENCE TIMER

The electronic timing unit enclosed within the dotted line 126 in Fig. 1b and as detailed in Fig. 4 has two independent timing circuits, #1 which controls relay SCR having one set time delay which is interlocked with relay CR4 and #2 which controls relay TCR having 13 independent adjustable timing circuits as through potentiometers PO1 through PO13 which are selected by the switches actuated by the cams on cam shaft 124.

Said potentiometers PO1 through PO13 may be conveniently varied to control the respective timing selections as by knobs (not shown) provided with pointers cooperating with appropriate markings on dial plate 127, Fig. 10, the different impulses through the associated cam operated switches to the #2 timer effecting predetermined lapses of time between indexing of the timer motor M4 from one position to the next in a manner to be later described in detail.

Said electronic sequence timer includes a transformer 128 with a secondary winding associated with each timing circuit, and an electron tube 129 with a cathode, a heater, a plate, and a grid.

In timer #1 there is a relay SCR and condenser 130 (1 mfd.) in the plate circuit. Also in timer #1, are resistors 131 (360M), 132 (360M), 133 (1 meg.) and 134 (75M) and another condenser 135 (1 mfd.).

In the #2 timer there is, in addition to the tube 129 (see Figs. 4 and 13) a relay TCR and condenser 136 (1 mfd.). Between the #1 and #2 timers is a condenser 137 (1 mfd.) in parallel with potentiometers PO1 to PO13 and associated switches 2 and 4, 6, 8, 10, 12, and 14MS. As aparent from Figs. 1b and 4, actuation of 2MS and one of the other switches (4, 6, 8, 10, 12, and 14MS) establishes a circuit through a particular potentiometer thus selected whereupon the voltage across condenser 137 decreases and the grid circuit of the tube 129 (herein a 6J5 tube) is made less and less negative with respect to the cathode and finally reaches a potential such that current will flow in the plate circuit whereupon the relay TCR will be energized. By appropriate adjustment of the potentiometers PO1 to PO13 the time delays may be desirably varied from a fraction of one second to thirty seconds or more. The condenser 136 is an anti-chatter condenser smoothing out the pulsating current in the plate circuit and thus preventing chatter of the relay TCR.

In Fig. 14 the time delay circuit comprises an indirectly heated cathode in the electron tube 228 in which the time period between closing of the switch 229 and operation of the relay TCR is dependent upon the length of time required for the heater element 230 in said tube to attain a predetermined temperature, such time period being desirably settable as by the variable resistance 231 in series with the switch 229 and heater element 230.

In Fig. 15 the time delay device comprises a rectifier 232, a switch 233 and a variable resistance 234 connected in series; a neon tube N and relay TCR connected in series, said lamp and relay being in parallel with a condenser 235 and with a switch 236. As aparent, when the switch 233 is closed, the condenser 235 gradually charges through the resistance 234 and the potential across the terminals of the condenser reaches the striking voltage of the neon tube N at which time the lamp passes a discharge energizing the relay TCR. The switch 236 when closed short-circuits and thus completely discharges the condenser preparatory to repeating the cycle through the same or one of the other resistances which will be provided for the same purpose as the potentiometers PO1–PO13 in the preferred form of sequence timer.

There are any number of similar or equivalent circuits coming within the scope of this invention in which the flow of electric current through an electromagnetic relay is controlled by a non-movable switch mechanism such as the electron tubes and neon tube mentioned above and a variable resistance or potentiometer controlling the time period between actuation of one switch mechanism which energizes the control circuit and another switch mechanism which energizes the electrically responsive power actuated unit. It is to be noted that in many cases the operation of the sequence timer depends upon the establishment or delay of the electron tube anode current controlled in time by a condenser and resistance network in the grid circuit of said tube. With respect to the Fig. 13 sequence timer, it is further contemplated to employ a thyratron tube along with any necessary modifications in the remaining elements of the circuit.

(a) Magnetic controls in timer

These controls comprise relays CR1 through CR6 and ratchet relay RCR. CR1 when energized completes any timing period that is set up and in addition energizes CR2. CR2 is a safety relay which completes all operating circuits. CR3 maintains the circuit on the cam shaft indexing motor M4 from one station to the next, energizes relay CR4 and resets the #2 timing circuit. Relay CR4 provides an interlock on the dynamic breaking unit 21DB, and sets up the drum run circuit through cam operated switch 3MS. CR5 reverses the cam shaft indexing motor M4. CR6 provides an interlock on the program motor circuit which blocks out advance of the timer during progressive operations on the machine. RCR is a ratchet relay which energizes CR5 which reverses the cam shaft motor M4 to repeat the ply application operation when building six-ply tires.

(b) Manual controlling devices in timer

These devices, as best shown in Fig. 4 comprise toggle switches SW1 through SW6, SW1 being an off-on control circuit switch, SW2 being a manual forward advance switch for the program motor M4, SW3 being a manual reverse switch for the program motor M4, SW5 being a manual switch rendering the entire control either semi-automatic or fully automatic, as previously indicated, SW4 being a selector switch for four-ply or six-ply tire construction control, and SW6 being a selector switch selecting either manual or automatic control of the machine.

V. DRUM INDEXING DEVICE

This device, as shown in Fig. 1a, is driven through sprockets 138 and chain 139 from the tire building drum shaft 101 at a 1:1 ratio and comprises a magnetic solenoid SOL#1 which engages a friction clutch assembly 140 and positions precision switches X1 through X7 for operation by cams 141 through 147 on the shaft 148 driven by one sprocket 138, said switches when actuated respectively stopping the drum in the first, second, third, fourth and fifth positions, advancing the drum so as to stop at any degree of rotation between 0 and 360° and stopping the drum after each complete revolution. The wiring diagram together with the disposition of the switches X1 through X7 is clearly shown in Figs. 7, 8 and 9.

Figure 5:
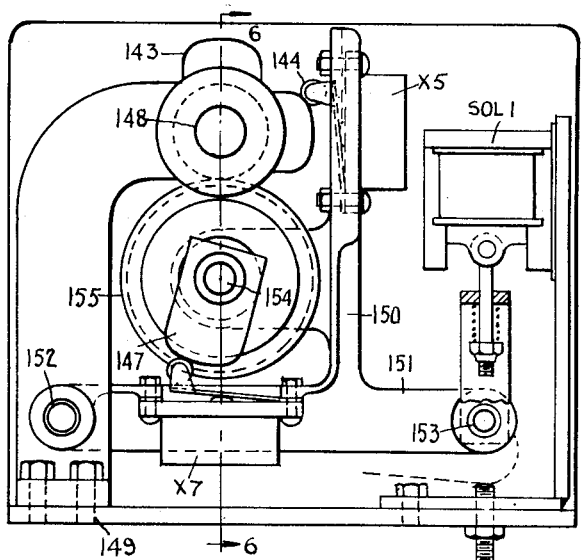
Fig. 5 is an end elevation view of the drum indexing device.
Figure 6:
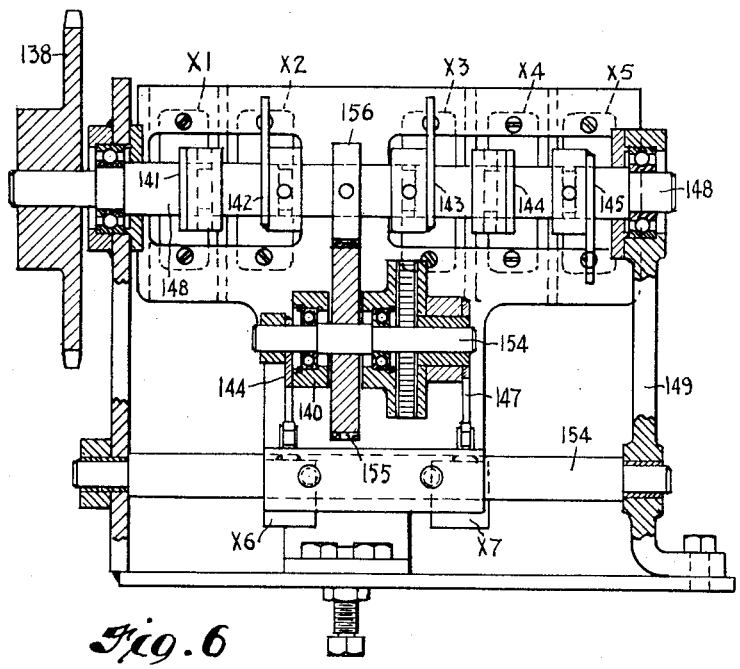
Fig. 6 is a cross section view taken substantially along the line 6—6, Fig. 5.

With respect to the detail construction of the drum indexing device, as shown in Figs. 5 and 6, the same comprises a base structure 149 in which is journalled the cam shaft 148 having the sprocket 138 at one end over which is trained the chain 139 sprocketed on a like sprocket wheel 138 on the inner shaft 101 of the drum 100, said shaft having five cams 141 to 145 axially spaced thereon for predeterminately actuating five switches X1 to X5 respectively movable by the solenoid SOL#1 into position for being actuated by the associated cam. Said switches X1 through X5 are carried on the lateral projection 150 of an arm 151 which has one end 152 pivotally connected to said base and the other end 153 pivotally connected to the armature of SOL#1. Below the cam shaft 148 is a countershaft 154 provided with a friction faced roller 155 thereon engageable with a roller 156 on the cam shaft in response to energization of the solenoid SOL#1. Said arm 151 has mounted thereon the switches X6 and X7 respectively adapted to be energized by cams 146 and 147 which are rotated by rotation of said countershaft through the friction roller 155 and the roller 156 on the cam shaft. Inasmuch as the functions of the switches X1 through X7 have been previously described, such will not now be repeated. Operation of said drum indexing device will be described in greater detail in the ensuing paragraphs.

VI. FULLY AUTOMATIC OPERATION OF THE MACHINE

To operate the machine automatically, the switches SW1 through SW6 are shifted to the following positions (see Fig. 4): SW1 on; SW2 off, as shown; SW3 off, as shown; SW4 to four ply or six ply as desired; SW5 and SW6 both in the automatic position. To initiate operation of the machine, the operator actuates the foot switch FS2 (Figs. 2b and 3) to close the circuit through lines 17 and 33, current flowing, as apparent from Fig. 4 (1) from power line 17, through upper of top pair of contacts of SW1, primary of transformer 128 to power line 41 thereby energizing the timing circuits and (2) from line 17 to line 33 (17 and 33 connected when FS2 actuated), SW6, relay CR1 to line 41 thus energizing said relay CR1 which as previously indicated completes any timing period which is set up. Energizing relay CR1 closes its normal open switches 157, 158, and 159 whereby to establish a circuit through line 17, 33, SW6, now closed switch 157 of relay CR1, line 5 (Fig. 4) thence from line 5 through normally closed thermoguard 160, normally closed overload switches 1IOL and 3IOL, relay 1CR, to line 41 (Fig. 3). In turn, the energization of relay 1CR as aforesaid closes its normally open switch 161 whereupon a circuit is established through lines 41, switch 161 of relay 1CR, line 18, (Fig. 3) and line 18, relay CR2 and switch 158 of relay CR1 (Fig. 4). Energization of relay CR2, in turn closes its normally open switches 162, 163, and 164 and opens its normally closed switch 165.

Now, as apparent from the outline below, the machine automatically performs the successive tire building operations, the various operations being marked on the program controller dial 125, Fig. 11 and noted on the cam diagram Fig. 12 as follows:

Gumbo

At this station the drum 100 must be expanded and rotated forward at high speed and torque for a time period sufficient to allow the operator to cement the edges of the drum. Forward rotation of the drum motor M1 is effected through the circuit: line 41, normally closed switch 166 of dynamic braking device 21DB, forward motor starter 21F, line 3 (Fig. 3) and line 3, lower set of contacts of switch 3MS, now closed switches 167 and 164 of relays CR4 and CR2 respectively, upper of the bottom pair of contacts of SW1 to line 17 (Fig. 4). As shown in Fig. 12, the cam which operates 3MS holds the same in forward position until near the end of the tire building procedure. Energization of 21F closes its normally open switches 168, 169, and 170 to rotate M1 forwardly.

High speed rotation of the drum motor M1 is effected through the circuit through line 41, now closed switch 161 of relay 1CR, relay 22CR, line 15 (Fig. 3) and from line 15 and through upper contacts of switch 5MS to switch 164 of relay CR2 (Fig. 4). As a consequence, the energization of relay 22CR, which is the inch drum interlock, closes its normally open switch 171 whereby current then flows through line 41, high speed control 21HSR, now closed switch 171 of relay 22CR, line 6, and switch PB1 to line 17 (Fig. 3). The resulting closing of the normally open switches 172, 173, and 174 of 21HSR effects high speed operation of M1.

High torque operation of the drum motor M1 is made possible by keeping open (by 7MS) the circuit through line 41, switch 161 of relay 1CR, line 18, TQCR and line 29.

Expansion of drum 100 is effected by the application of brake 103 through SV7 in a manner already described through line 41, now closed switch 161 of relay 1CR, line 18, SV7, line 38 (Fig. 3) and line 38, 13MS, now closed normally open switch 175 of relay CR3 (energized by the indexing switch 1MS) to the now closed switch 164 of relay CR2 (Fig. 4).

The synchronous timer motor M4 operates through line 41, relay CR3, timer indexing switch 1MS, upper contact of middle pair of SW1 to line 17. As the cam shaft 124 driven by M4 starts to advance, the relay CR2 seals in through 23MS. The energization of relay CR3 closes its normally open switch 176 and opens its normally closed switches 177 and 177A, the motor being disposed between line 41 and said switches 176 and 177. As soon as the timer indexing switch 1MS is opened by its cam, the relay CR3 is deenergized, opening its switch 176 to stop said motor M4 and to close its switch 177 preparatory to starting said motor upon closing of the normally open switch 178 of relay TCR. The time relay TCR is reset or the timing condenser 137 is recharged, deenergizing TCR by the normally closed switch 177A of relay CR3 during the time that the indexing switch 1MS is closed to energize CR3.

At the time of opening of 1MS deenergizing relay CR3, 14MS is actuated by its cam to cause current to flow from the #1 timer secondary circuit of transformer 128, to SW5, bottom contacts of 2MS, top contacts of 14MS, PO1 to the grid of the tube 129 in the #2 timer. As previously explained, after the lapse of a predetermined time interval (depending on setting of PO1) the grid bias is reduced whereupon increased plate current energizes TCR and closes its switch 178. Thus, the drum will rotate as aforesaid for a predetermined time in accordance with the setting of PO1 while the operator applies cement to the drum.

Spot drum #1 position

When the "Gumbo" timing period has elapsed, relay TCR is energized to close its normally open switch 178 whereupon motor M4 indexes to the next station "Spot drum #1 position" through line 41, now closed switch 177 of relay CR3, now closed switch 178 of relay TCR, normally closed switch 179 of relay CR6, switch 163 of relay CR2, upper of middle pair of contacts of SW1 and line 17. The motor M4 in so rotating again closes the timer indexing switch 1MS, energizing relay CR3 whereupon further rotation causing subsequent opening of 1MS is through switch 176 of relay CR3 as previously described. Such indexing of motor M4 shifts timing transfer switch 2MS (see Fig. 12) cutting off current through 14MS and PO1 whereupon relay TCR is reset or the condenser 137 recharged as aforesaid, the deenergization of TCR thus opening its switch 178 and interrupting operation of M4.

At this station the drum must be stopped at a predetermined position and remain stopped for a preselected time so that the operator may place the end of the first ply onto the drum.

Inasmuch as the drum has been operating at high speed, dynamic braking must be applied in order to rapidly stop the drum. This is effected through the relay CR4 which as previously indicated is an interlock on the dynamic braking device 21DB, sets up the drum operation through its normally open switch 167 and 3MS and which has up to this point been energized through line 41, switch 161 of relay 1CR and line 18 (Fig. 3), line 18, line 58 (Fig. 4) lines 58, 57, 56, 55, 54, 53, 52, 51 (switches X7, X6, X5, X4, X3, X2, X1 of Fig. 7), line 51, 15MS, switch 180 or 181 of relay CR4 or CR3, switch 183 of relay SCR, switch 163 of relay CR2, upper of middle pair of contacts of SW1 to line 17. At this stage 18MS is actuated and closes the circuit from lines 18 to 50 and through SOL#1 to energize the latter and thus operate the armature thereof to cause the cam 141 therein to actuate switch X1 opening the circuit through relay CR4. The deenergization of relay CR4 opens its normally open switch 167 to thus kill the motor M1 circuit, starter 21F being deenergized closing its normally closed switch 184 (Fig. 3) and opening its normally open switches 168, 169, 170. The dynamic braking unit 21DB will consequently be energized (see Fig. 3) through line 41, normally closed switch 185 of dynamic braking time delay relay 21TD, normally closed switch 186 of motor M1 reverse starter 21R, now closed switch 184 of 21F, line 27, lower set of contacts of PB2, line 31, upper set of contacts of FS2, and lower set of contacts to FS1 to line 17. At the same time device 21TD will be set in operation through line 41, line 44, normally closed limit switch 3LS, line 32 (Fig. 3), and line 32, now closed switch 187 of relay CR4, line 26 (Fig. 4) switch 188 of relay 22CR, line 6, PB1, to line 17. Relay 22CR has been deenergized by the actuation of 5MS to low speed position by its cam as evident from Fig. 12.

After a predetermined interval, device 21TD will be energized to open its switch 185 and thereby open the circuit through 21DB, such interval usually being set so as to be slightly longer than the required motor M1 stopping time.

With the drum so spotted in the #1 position, the next step is to maintain a status quo until the operator has time to place the end of the first ply onto the drum. This is accomplished by the impulse through 6MS and PO2 which after such time as settable by PO2 the switch 178 relay TCR is closed to set up operation of the motor M4 for indexing to the next station.

*Run ply #1*

At this station the drum must be rotated forward, low speed, low torque for one complete revolution and then stopped long enough to permit the operator to cut the first ply.

With timer motor M4 set in operation in conjunction with 1MS and relay CR3 as aforesaid, switch 18MS is opened whereupon relay CR4 is again energized thereby initiating forward rotation of motor M1 through 3MS. The indexing of motor M4 actuates 7MS (5MS having been previously actuated at the second station) so that current flows through line 41, switch 161 of relay 1CR, line 18, TQCR, and line 29 (Fig. 3) line 29, 7MS, low speed contacts of 5MS, switch 164 of relay CR2, upper of bottom pair of contacts of SW1 to line 17 (Fig. 4). The low speed control 21LSR for motor M1 is energized through lines 41 and 26, switch 188 of relay 22CR (relay 22CR now deenergized by opening of circuit through line 15 leading to upper contacts of 5MS), line 6, PB1, to line 17. As previously described, M4 is stopped by the opening of 1MS.

Stopping of the drum is effected by actuation of the one revolution switch 28MS, which energizes SOL#1 through line 18, line 50, 28MS, line 57 and successively through line 51 and through 15MS. Energization of SOL#1 operates the drum indexing device to cause switch X7 therein (after one full revolution) to open the circuit between lines 58 and 57 (lines 58 and 57 also open at 28MS) whereupon to open the relay CR4 circuit through lines 58 to 51 to 15MS, such deenergization of CR4 stopping the drum motor M1 in a manner previously described.

The timer motor M4 in indexing to this station actuates 8MS which, through PO5, effects desired timing to permit the operator to cut the first ply.

*Index servicer—Splice ply*

The timer motor M4 in indexing to this station (upon energization thereof through switch 178 of relay TCR) actuates 29MS thereby energizing the index servicer (see Figs. 1b and 4) to cause the latter to position the second ply within convenient reach of the operator.

At this station, the timing period for allowing the operator to splice the first ply is through 10MS and PO6, the former having been actuated by its cam as shown in Fig. 12. 15MS is open at this station so that the relay CR4 remains deenergized.

*Spot drum—#2 position*

At this station the drum must be advanced a part turn and stopped and time allowed for the operator to apply the second ply to the drum.

This is accomplished by closing of 15MS and consequent closing of the motor M1 forward circuit through 3MS, and energization of SOL#1 of the drum indexing device through lines 18 and 50, 26MS, and lines 57 to 56 (X6) to line 51 and 15MS. After predetermined rotation of M1, X6 is actuated by its cam to open the circuit through lines 57, 56 to again deenergize relay CR4 as heretofore explained, stopping the motor M1 at this position.

The time for starting the second ply is through 4MS, and PO3 or PO3 and PO4 when switch 189 of relay CR5 is closed, said relay CR5 reversing the cam shaft indexing motor M4.

*Run ply 2—run plies 3 and 4; index servicer—splice ply—spot drum 3 and 4 position (6 ply)*

The timer then indexes successively to run ply 2 allowing time for cutting and to index servicer allowing time for splicing in a manner already clearly described.

When six ply tires are being constructed the switch SW4 is in 6 ply position rendering the ratchet relay RCR and its switches 190 and 191, and the 6 ply repeat switches 19MS and 21MS operative, the timer then successively indexing to spot drum #3 position, run ply #3, index servicer—splice ply, spot drum #4 position, run ply #4, and index servicer splice ply. The energization of ratchet relay RCR through line 41, 19MS, upper of top pair of contacts of SW4, upper of bottom pair of contacts of SW1 to line 17 effects closing of its switches 190 and 191 whereupon reversing relay CR5 is energized actuating its switches 192 for reversing the operation of the timer motor M4 and its switch 193 in line 57. The ply running, servicer indexing and drum spotting operations are thus repeated as outlined. The drum spotting in positions #3 and 4 is through 26MS. In the spot drum—#2 position the drum is advanced one-sixth revolution through 26MS, switch 193 of relay CR5 then being open.

*Plies down*

Following the splicing of ply 2 (4 ply tires) or ply 4 (6 ply tires) the marginal edges of the plies are turned down across the ends of the drum while the drum is rotating forward, low speed, high torque.

The motor M4 in indexing to this station actuates 17MS energizing solenoid air valve SV1 as follows: line 41, switch 161 of relay 1CR, line 18, SV1, and line 37 (Fig. 3), and line 37, 17MS, switch 164 of relay CR2, upper of bottom pair of contacts of SW1 to line 17 (Fig. 4). Energization of SV1 in turn opens communication between the air supply source and the cylinder 107 to move the hold down elements 105 into contact with the plies on the drum followed by movement of the breakover or turndown elements 106 across the drum ends to force the overhanging ply edges inwardly of the drum.

The drum motor M1 is rotated forward through 3MS, at low speed through 5MS, and at high torque through 7MS.

Timing of this operation is through 12MS and PO7 in a manner already explained after which the drum motor M1 is stopped by actuation of 15MS and deenergization of relay CR4.

*Bead set*

The timer motor M4 in indexing to this station actuates 9MS, energizing solenoid air valve SV2 as follows: line 41, switch 161 of relay 1CR, line 18, SV2, and line 36 (Fig. 3), line 36, 9MS, switch 164 of relay CR2, upper of bottom pair of contacts of SW1 to line 17 (Fig. 4). Energization of SV2 permits air under pressure to actuate cylinders 109 to move the bead setting rings 110 toward the drum ends to position the beads carried thereon and associated flipper strips against the previously turned down plies.

The timing of the bead setting operation is through 14MS and PO8.

On the in-stroke of the bead setting rings, the limit switch 3LS is actuated thereby to rotate the drum motor M1 forward at high speed, such actuation energizing relay 3CR as follows: line 41, switch 161 of relay 1CR, line 18, 3CR, 3LS, and line 21 (Fig. 3), line 21, upper of bottom pair of contacts of SW6, switch 164 of relay CR2, upper of bottom pair of contacts of SW1 to line 1 (Fig. 4). Energization of 3CR closes its switches 195 and 196 whereupon current flows through line 41, forward starter 21F, switch 195 of relay 3CR and line 15 (Fig. 3), and line 15, 5MS, and switch 164 of relay CR2 (Fig. 4). Thus, motor M1 is rotated forward (through 21F) and at high speed (through 5MS and circuit through 21HSR).

During this operation, the flipper stitchers 111 press the flipper strips on the beads against the plies by the energization of solenoid air valve SV3 through the time device 3TD actuating its switches 197 and 198 so that SV3 is energized, the lines for 3TD and SV3 leading to 3LS.

*Turn up*

At the end of the bead set timing period releasing the bead setting rings and maintaining forward, high speed rotation of the drum, the motor M4 indexes to the "turn up" station. On the out-stroke of the bead setting rings, the limit switch 4LS is tripped thereby to start the bead stitcher turn up energizing relay CR6. Tripping 4LS energizes 32XCR and 32CR through lines 18 and 25, 4LS, line 16, 3LS to line 21 and thence to line 17 as previously described in relation to 3LS. Later, even though 3LS is opened, the circuit is maintained through line 25, PB4, line 24, switch 199 of relay 32CR, line 23, 6LS to line 22 (Fig. 3) and thence line 22, relay CR6, transformer 128, upper of top pair of contacts of SW1 to line 17 (Fig. 4). Relay 32CR is the set up relay for starting the "turn up" operation. The energization of CR6 opens its switch 179 which is an interlock on the timer motor circuit as shown to block out advance of the timer during the following operations.

Energization of 32XCR and 32CR as aforesaid, closes switch 200 of 32XCR to energize solenoid valve SV5 to supply low pressure air for actuating the bead stitcher tools 114, and to energize relay 31R for causing the bead stitcher motor M2 to rotate the bead stitcher from the inside of the drum to the surface of drum by actuation of switches 201, 201' and 201" of relay 31R and time relay 31TD which after predetermined time closes its switch 202 to energize solenoid valve SV6 which then supplies high pressure air to the tools 114. Energization of SV5, SV6, 31TD and 31R is through lines 18 and 9, switch 200 of 32XCR, now closed contacts of limit switch 5LS to line 22. Upon opening of these contacts of 5LS by movement of tools 114 the circuit is maintained through line 28 and contacts of limit switch 6LS to line 22.

The bead stitcher motor M2 is stopped and the tools 114 retracted by the tripping of the contacts of limit switch 6LS thereby. Opening of 6LS also opens the holding circuit of 32XCR and 32CR.

*Spot drum #3 position—#5 position (6 ply)*

The opening of 6LS as aforesaid also opens the circuit through CR6 whereupon its switch 179 closes to set the timer motor M4 in operation for indexing to this station. At this station the motor M4 is stopped as before, for the time interval set by PO2 through the tripping of 8MS, allowing the operator to place the third ply (four ply tires) or fifth ply (six ply tires) onto the drum.

*Run ply #3 or #5 (6 ply); index servicer—splice ply; spot drum #4 position—#6 position (6 ply); run ply #4 or #6 (6 ply); index servicer—splice ply; spot drum for chafer and breaker; run chafer and breaker and splice*

After the time interval determined by PO2, the timer motor M4 successively indexes to the above seven stations as before described, the timing for starting the chafer and breaker strips being controlled by 4MS and PO9 and for splicing the chafer and breaker strips by 6MS and PO10. The ply starting, cutting, and splicing operations are timed as already described.

In the case of four ply tires, the spotting of the drum motor M1 at the #3 and #4 positions is through 20MS and 26MS and X2 and X6 of the drum indexing device whereas in the case of six ply tires the spotting for fifth and sixth plies is through 20MS (X3 of drum indexing device) and 26MS (X6 of drum indexing device). The spotting of the chafer and breaker strips is effected through 22MS (X4 of drum indexing device).

Gas for tread

At this station the drum motor M1 is rotated forward at high speed for a predetermined time interval through 8MS and PO11 for permitting gassing of the stock on the drum preparatory to adhering the tread thereonto. Forward high speed rotation of motor M1 is effected by energization of 5MS which as evident Fig. 12 has been actuated from its low speed position, and 3MS which has remained in its forward position since initiation of the operation of the machine.

Spot drum for tread

Following the elapse of the timing period for gassing the stock, the timer motor M4 indexes to this station energizing X5 in the drum indexing device through the actuation of 24MS, the actuation of the latter energizing SOL#1 whereupon predetermined rotation of the cam shaft in said drum indexing device, and the opening of X5 opens the relay CR4 circuit thus opening its switch 167 which is in series with the forward control switch 3MS. The drum motor M1 is therefore stopped at this position, a time period for starting the tread being provided through 10MS and PO12, the timing transfer switch 2MS having been actuated at the station following "Run ply #4—#6."

Run tread and splice

Timer motor M4 then indexes to this station whereupon the drum rotates forward, low speed, and high torque through 3MS, 5MS, and 7MS in a manner already described (see Fig. 12).

At this station, the actuation of 28MS (one revolution control switch) energizes SOL#1 in the drum indexing device whereupon after one revolution the switch X7 in the latter device is opened to deenergize relay CR4 and open its switch 167 to kill the drum motor circuit.

Also at this station, the actuation of 12MS in circuit with PO13 retains the drum motor stopped for a set time to permit the operator to make the tread splice.

Tread stitch and tuck under

The timer, after the lapse of time determined by the setting of PO13, then indexes through these two stations (see cam associated with timer indexing switch 1MS in Fig. 12).

Such indexing actuates 3MS to cause motor M1 to rotate in reverse (line 41, switch 166 of 21DB, motor starter 21R, to line 2 [Fig. 3], line 2, 3MS, switches 167 and 164 of relays CR4 and CR2 respectively, upper of bottom pair of contacts of SW1 to line 17 [Fig. 4]), and actuates 5MS to cause motor M1 to rotate at high speed (as already described in connection with other preceding operations). The energization of 21R, as stated, closes its switches 203, 204, and 205 to reverse motor M1.

Such indexing further energizes the tread stitching circuit and relay CR6 which blocks out further advance of the timer motor during these tread stitching and tuck under operations.

Referring to Fig. 3, relay 2CR (electrical interlock for tread stitcher motor M3 return starter 11R) and 11TD (time delay relay for cutting off 11F after time period) are first energized as follows: line 41, switch 161 of relay 1CR, 2CR and 11TD, normally closed switch 206 of 11R, normally closed limit switch 1LS, to line 7, thence as shown in Fig. 4 through line 7, 11MS, switch 164 of relay CR2, upper contact of bottom pair of contacts in SW1 to line 17. The resulting closing of switches 207 and 208, the latter after predetermined time lapse, of relay 11TD and switch 209 of relay 2CR energizes tread stitcher motor starter 11F and SV4, the latter through line 47, contacts of 8LS, switch 209 of relay 2CR, and line 21. The energization of 11F closes its switches 210, 211, and 212 to initiate operation of motor M3 to move the tread disks 117 away from one another, said disks being then yieldably positioned against the tread on the drum by low pressure air admitted into the cylinders 119 through the energization of SV4. The energization established through line 22, relay CR6, transformer 128, upper contact of the top pair of contacts of SW1 to line 17, to energize said relay CR6 as aforesaid blocks out the timer motor M4 advance. In Fig. 3, the switch 210a of 11F completes the circuit from line 41 to line 22.

During the outstroke of the tread stitcher disks 117 limit switch 8LS is actuated thereby to energize SV3 whereupon high pressure air is supplied to the cylinders 119. Thereafter limit switch 1LS is actuated by the tread stitcher to open the circuit through 2CR and 11TD whereupon 11F is deenergized by the resulting opening of switch 208 of 11TD. Deenergization of 2CR closes its switch to establish a circuit through the tread stitcher motor starter return 11R through line 18, 11R, switch 213 of relay 2CR, 2LS, line 34, lower contacts of PB7 to line 21 (Fig. 3) and thence through line 21, upper contact of bottom pair of contacts of SW6, switch 164 of relay CR2, upper of bottom pair of contacts of SW1 to line 17. Energization of 11R closes its switches 214, 215, and 216 to cause motor M3 to return the tread stitcher to its initial position. The return of the tread stitcher is stopped by the tripping of limit switch 2LS thereby.

Actuation of 1LS as aforesaid also closes a circuit through line 18, relay 32CR1, line 11, 1LS to line 21 (Fig. 3) and thence from line 21 to 17 (Fig. 4) as previously explained, such energization of 32CR1 closing its switches 217, 218 and 219 to establish an energizing circuit through bead stitcher motor M2 to cause the tools 114 actuated thereby to move from the surface of the drum to the interior of the latter to perform the "tuck under" operation. Energization of 31F is effected as follows: line 18, 31F, line 10, switch 217 of relay 32CR1, line 8, 5LS, to line 22 (Fig. 3) and thence line 22, relay CR6, transformer 128, SW1 to line 17. The closing of switch 218 of relay 32CR1 also energizes solenoid air valve SV5 through line 18, SV5, and switch 218 of relay 32CR1 to switch 217 of relay 32CR1 to supply air for yieldably positioning the tools 114 against the stock. The motor M2 is operated in the required direction as a result of the energization of 31F and actuation of the switches 220, 221 and 222 of the latter. Furthermore, upon closing of switch 218 of 32CR1, relay 31TD is thus energized closing its switch 202 after a predetermined time to thus energize the solenoid air valve SV6 supplying high pressure air to the bead stitcher device.

When the "tuck under" operation has been completed the bead stitcher device actuates limit switch 5LS, to stop motor M2 with the tools 114 at the inside of the drum and to deenergize SV5, SV6, and 31TD. Actuation of 5LS also closes the circuit through 31R, line 28, 5LS, 7LS to line 21 to operate motor M2 to return the bead stitcher device to its idle position, such circuit being maintained through switch 223 of 31R and 6LS. The bead stitcher is stopped at the surface of the drum by the actuation of 6LS and stopped at its idle position by the actuation of 7LS. Set up relay 32CR1 is deenergized in the following manner: Limit switch 1LS is tripped at the end of the tread stitcher travel whereby insufficient current flows through 32CR1 to retain the latter energized, to thus open circuit through line 22 and relay CR6 whereupon timer motor M4 is again rendered operative. However, such deenergization of 32CR1 does not disturb the operation of the bead stitcher by 31F because of holding switch 224 of latter.

*Collapse drum*

The final position to which the timer indexes is this one whereat drum rotates in reverse (through 3MS) at high speed (through 5MS). Also solenoid air valve SV7 is energized to effect application of the brake to the quill to thus collapse the drum. Following collapse of the drum the timer motor M4 further indexes to actuate 23MS which deenergizes relay CR2 opening its switches 162, 163 and 164 to render machine inoperative except upon reinitiation by actuation of foot switch FS2 as first mentioned.

With the drum stopped and collapsed the completed tire carcass may be removed and new beads mounted onto the bead setting rings preparatory to building another tire.

From the foregoing it is evident that the entire tire building operation and control of the machine is greatly simplified as to the number of manual operations required to be performed by the operator. Furthermore, individual operations may be timed to suit the aptitudes of the particular operator within a very short time whereby the same machine may be used by successive operators on succeeding shifts. With the electronic control device, time settings can be rapidly made for all operations simply by rotating the proper potentiometer knobs. In this arrangement it is not necessary to interchange or move complicated cams and thus the machine when in operation twenty-four hours per day may be used by successive operators and set at optimum efficiencies of the respective operators.

It is to be noted that operation of the machine may be interrupted at will simply by moving SW1 to the "Off" position thereby opening the operating circuits and subsequent movement of SW1 to "On" starts machine at place of interruption. The interruption of the automatic cycle is accomplished by operating either push button PB1 or foot switch FS1 and cycle restarted by actuating FS2.

Also, should it be desired to repeat any operation the actuation of the manual reverse switch SW3 for the timer motor M4 energizes relay CR5 to operate said motor M4 in a reverse direction. Likewise, manual forward advance of said motor independent of 1MS to skip operations whenever desired may be effected by actuation of SW2 whereupon current flow through relay CR3, top contact of SW2, through switch 165 of relay CR2, and upper of middle pair of contacts of SW1 to line 17, operates said motor M4 in a forward direction.

Although the preceding description is specifically directed to the electronic sequence timer disclosed in Figs. 4 and 13, it will be apparent that a plurality of resistors 231 and 234 and switches 229 and 233, Figs. 14 and 15 respectively, corresponding to the potentiometers PO1—PO13 and switches 4, 6, 8, 10, 12, and 14MS may be employed. For other typical electronic time delay devices refer to the article in the August 1943 issue of "Radio News."

SEMI-AUTOMATIC OPERATION

In order to operate the machine semi-automatically the manual switch SW5 is shifted to the position "s. a." in Fig. 4 whereby to disconnect the automatic time advance of the timer. With SW5 in such semi-automatic position, as is apparent from the wiring diagrams of Figs. 3 and 4, the timer must be advanced by the foot switch FS2 for each operation to be performed.

In this way new operators may be quickly trained and after building a few tires in this manner the potentiometers PO1 to PO13 may be set accordingly and the machine operated automatically thereafter, with later modifications in the potentiometers made to accommodate the peculiar skills of the operator.

MANUAL CONTROL

Manual control of the machine is effected by actuating the switch SW6 to the "manual" position thereby opening the relay CR1 circuit, closing circuits between lines 33 and 2, lines 31 and 20, and lines 21 and 31.. "Reset" safety relay PB5 is also actuated to energize relay 1CR, such energization being maintained through its switch 225 in parallel with PB5.

Referring now especially to Figs. 2a, 2b, and 3, the manual operation of the machine is effected as follows, the successive operations being outlined rather generally without unnecessarily repeating the tracing of the detail circuits or of describing other switches actuated by the several relays of Fig. 3.

(1) The forward push button PB2 is first actuated to rotate the drum forward at high speed for cementing the edge of the drum before applying the stock. Actuation of PB2 closes its upper pair of contacts (Fig. 3) to close the circuit between lines 41 and 17 and forward starter 21F for motor M1. High speed operation is effected by the energization of relay 22CR and consequent closing of its switch 171 in the high speed control device 21HSR, thus energizing the latter. The circuit through 22CR is maintained through its switch 226, lines 20 and 31 through FS2 and FS1 to line 17.

Tripping of either FS1 or FS2 momentarily deenergizes 22CR so that its switch 226 opens the holding circuit through 21F and releasing of FS1 or FS2 closes the dynamic braking circuit through 21DB and now closed switch 184 of 21F through line 27, PB2 line 31, FS2 and FS1 to line 17.

Application of the brake 183 to expand the drum is effected by actuation of FS5 to energize SV7.

(2) The first and second plies are applied onto the drum by actuating FS1 which is the inch forward low speed control of the drum. In such low speed inching operations dynamic braking is not applied.

Actuation of FS1 as aforesaid closes the circuit through 21F for causing the motor M1 to rotate forward. Low speed operation of M1 by 21LSR is through normally and now closed switch 188 of relay 22CR. Subsequent deenergization of 21F after one revolution is effected by release of FS1.

(3) The ply breakover operation is performed again by actuating FS1 which rotates drum forward low speed as aforesaid and FS3 which energizes SV1 to position the breakover tools. Release of said foot switches FS1 and FS3 causes tools to drop away and motor M1 to stop.

(4) To perform the bead setting operation FS4 is actuated closing the circuit through SV2, line 36, FS4, line 21, line 31 (see Fig. 4), FS2, FS1 to line 17, thus energizing SV2 to move the bead setting rings against the drum shoulders.

As the rings near the drum, limit switch 3LS is tripped. Such tripping of 3LS energizes relay 3CR whereupon closing of its switches 195 and 196 again energizes 21F, 22CR, and 21HSR in the manner stated above to rotate the drum forward at high speed.

After the beads are set, a sequence solenoid air valve SV8 is energized (by energization of 3TD at same time as 3CR and timed closing of switch 198 of 3TD and timed opening of switch 197 of 3TD) to apply air to the flipper stitching tools which stitch the bead flipper to the plies.

Release of FS4 effects retraction of flipper stitchers and movement of bead ring arms away from drum, deenergizing SV2. SV8 is deenergized after time lapse of 3TD which actuates its stitch 197. Movement of bead ring arms away from drum opens 3LS to deenergize 3CR and 3TD.

On the outstroke of the bead ring arms while 3LS is yet closed, limit switch 4LS is tripped energizing the turn up bead stitcher operation energizing relays 32XCR and 32CR and 31R, 31TD, SV5, and SV6 in the manner previously stated, whereby the stitching sequence is completed through 5LS, 6LS and 7LS. Energization of 31R rotates bead stitcher motor M2 to cause the tools moved thereby to move from inside to surface of drum.

When the stitching is completed, the drum is stopped by tripping either FS1 or FS2.

(5) The third and fourth plies are applied in the same manner as the first and second plies as stated in paragraph 2 above.

(6) Chafer and breaker strips are also applied as stated in paragraph 2 above.

(7) Gassing of the stock is performed by pressing push button PB2 which rotates drum forward at high speed, gas being applied as by a hand swab or other convenient manner. The drum is stopped again by tripping either FS1 or FS2.

(8) Tread stock is applied in the same manner as stated in paragraph 2 above.

(9) Tread stitching is performed by pressing push button PB7 which energizes the tread stitching operation and rotates the drum in reverse at high speed. Pressing of PB6 energizes 2CR and 11TD to cause motor M3 to rotate in a direction for actuating the tread stitcher disks and also establishes circuits through SV3 and SV4 successively to yieldably press said disks against the tread. The energization of 2CR closes its switches 227 to energize 21R and 22CR to rotate motor M1 in reverse and at high speed.

Limit switch 1LS is then tripped when the tread stitching is complete, thus stopping and returning the tread stitcher. 1LS also energizes the turn down bead stitching operation by energizing 32CR1 and thus 31F, SV5, and SV6, and 31TD, rotating motor M2 in a direction to cause stitcher tools to move from surface of drum to inside of drum, the sequence being controlled through 5LS, 6LS, and 7LS.

The tread stitcher return is stopped at its starting position by the limit switch 2LS which opens the circuit through 11R which is the motor starter for M2 for tread stitcher return.

(10) The drum is collapsed by pressing foot switch FS2 which rotates drum reverse and at low speed and pressing foot switch FS5 which energizes SV7 which applies air to brake 103 to collapse drum. Both FS2 and FS5 are then released.

(11) With the drum collapsed the tire carcass may be removed and new beads placed on the bead rings preparatory to building another tire.

With the foregoing in mind it is clear that an extremely versatile control for tire building machines has been provided whereby onto a basic circuit for manual operation may be imposed either a semi-automatic control requiring repeated actuation of one manual switch for sequential operations or a completely automatic electrically timed and readily settable control requiring single actuation of a manual switch whereupon the entire tire building procedure continues from beginning to end without further manipulation of switches. It will be apparent that the teachings of the present invention may be adapted for use in machines other than tire building machines wherein it is desired to effect sequential and timed operation of a plurality of electric power units.

Other modes of applying the principle of the invention may be employed, change being made as regards the details described, provided the features stated in any of the following claims, or the equivalent of such, be employed.

I therefore particularly point out and distinctly claim as my invention:

1. In a tire building machine, the combination with an electrically responsive power unit and a switch mechanism in circuit therewith controlling energization and deenergization thereof, of a control circuit for said unit connected with an energy source, a series of cams including one for actuating said switch mechanism, means in said control circuit for moving said cams, another switch mechanism in circuit with said means and actuated by another one of said cams to successively energize and deenergize said means, a timing device in said control circuit, a relay functionally responsive to current flow through said timing device and in circuit with said means for energizing the latter independently of said another switch mechanism, and means in said control circuit and in circuit with said timing device adjustable to regulate the time interval after deenergization of said first means by said another switch mechanism before the current flow through said timing device builds up to energize said relay, said power unit being selectively maintained energized and deenergized by said switch mechanism during such time interval.

2. In a tire building machine, the combination with a plurality of electrically responsive power units and a corresponding number of switch mechanisms in circuit therewith controlling energization and deenergization thereof, of a control circuit for said units connected with an energy source, a series of cams including one for each switch mechanism, means in said control circuit for moving said cams, another switch mechanism in circuit with said means and actuated by another one of said cams to successively energize and deenergize said means, a timing device in said control circuit, a relay functionally responsive to current flow through said timing device and in circuit with said means for energizing the latter independently of said another switch mechanism, and plural means in said control circuit and in circuit with said timing device individually adjustable to regulate the time interval after deenergization of said first means by said another switch mechanism before the current flow through said timing device builds up to energize said relay, other switch mechanisms in circuit with said plural means and actuated by others of said cams to render said relay selectively operable through one of said plural means, said first-named switch mechanisms being actuated in desired sequence by their respective cams for maintaining said power units energized and deenergized in the time intervals between deenergization and energization of said cam moving means as aforesaid.

3. In a tire building machine, the combination with an electrically responsive power unit and a switch mechanism in circuit therewith controlling energization and deenergization thereof, of a control circuit for said unit connected with an energy source, a series of cams including one for actuating said switch mechanism, means in said control circuit for moving said cams, another switch mechanism in circuit with said means and actuated by another one of said cams to successively energize and deenergize said means, a timing device in said control circuit, a relay functionally responsive to current flow through said timing device and in circuit with said means for energizing the latter independently of said another switch mechanism, and means in said control circuit and in circuit with said timing device adjustable to regulate the time interval after deenergization of said first means by said another switch mechanism before the current flow through said timing device builds up to energize said relay, said power unit being selectively maintained energized and deenergized by said switch mechanism during such time interval, said regulating means comprising a variable resistance.

4. In a tire building machine, the combination with an electrically responsive power unit and a switch mechanism in circuit therewith controlling energization and deenergization thereof, of a control circuit for said unit connected with an energy source, a series of cams including one for actuating said switch mechanism, means in said control circuit for moving said cams, another switch mechanism in circuit with said means and actuated by another one of said cams to successively energize and deenergize said means, a timing device in said control circuit, a relay functionally responsive to current flow through said timing device and in circuit with said means for energizing the latter independently of said another switch mechanism, and means in said control circuit and in circuit with said timing device adjustable to regulate the time interval after deenergization of said first means by said another switch mechanism before the current flow through said timing device builds up to energize said relay, said power unit being selectively maintained energized and deenergized by said switch mechanism during such time interval, said regulating means comprising an electron tube controlling current flow in said timer circuit, and a variable resistance connected with said tube to predeterminedly delay the energization of the latter.

5. In a tire building machine, the combination with an electrically responsive power unit and a switch mechanism in circuit therewith controlling energization and deenergization thereof, of a control circuit for said unit connected with an energy source, a series of cams including one for actuating said switch mechanism, means in said control circuit for moving said cams, another switch mechanism in circuit with said means and actuated by another one of said cams to successively energize and deenergize said means, a timing device in said control circuit, a relay functionally responsive to current flow through said timing device and in circuit with said means for energizing the latter independently of said another switch mechanism, and means in said control circuit and in circuit with said timing device adjustable to regulate the time interval after deenergization of said first means by said another switch mechanism before the current flow through said timing device builds up to energize said relay, said power unit being selectively maintained energized and deenergized by said switch mechanism during such time interval, said regulating means comprising a condenser and variable resistance in parallel in said timer circuit.

6. In a tire building machine, the combination with an electrically responsive power unit and a first switch mechanism in circuit therewith controlling energization and deenergization thereof, of a control circuit for said unit comprising timer and program control circuits connected with an energy source, an electric motor in said program control circuit, a series of cams operated by said motor, a second switch mechanism in circuit with said motor and actuated by one cam to successively energize and deenergize said motor, a timing device in said timer circuit, a relay functionally responsive to current flow in said timer circuit and in circuit with said motor for energizing said motor independently of said second switch mechanism, and means in said timer circuit adjustable to regulate the time interval after deenergization of said motor by said second switch mechanism before the current in said timer circuit builds up to a predetermined value, said first switch mechanism being actuated by another cam for selectively maintaining said power unit energized and deenergized in the time interval between deenergization and energization of said motor as aforesaid.

7. In a tire building machine, the combination with a plurality of electrically responsive power units and a corresponding number of switch mechanisms in circuit therewith controlling energization and deenergization thereof, of a control circuit for said units comprising timer and program control circuits connected with an energy source, an electric motor in said program control circuit, a series of cams operated by said motor, another switch mechanism in circuit with said motor and actuated by one cam to successively energize and deenergize said motor, a timing device in said timer circuit, a relay functionally responsive to current flow in said timer circuit and in circuit with said motor for energizing said motor independently of said another switch mechanism, and plural means in said timer circuit individually adjustable to regulate the time interval after deenergization of said motor by said another switch mechanism before the current in said timer circuit builds up to a predetermined value, cam operated means in circuit with said plural means to select a predetermined one of the latter, said first-named switch mechanisms being actuated in desired sequence by said cams for maintaining said power units energized and deenergized in the time interval between deenergization and energization of said motor as aforesaid.

8. In a tire building machine, the combination of a rotary tire building drum, and a control circuit therefor connected with an energy source and operative to rotate said drum for a predetermined time interval and to stop said drum at a preselected position, said control circuit comprising an electric motor for rotating said drum, a first cam-operated switch mechanism in circuit with said motor for energizing the latter, an energizable drum indexing device in said control circuit and including a plurality of cam-operated switch mechanisms in circuit with said motor and selectively actuatable only when said indexing device is energized to deenergize said motor upon rotation to a desired position, an electronic timing device in said control circuit including a plurality of cam-operated switch mechanisms in circuit with said motor and selectively actuatable to energize said motor through said first switch mechanism and a selected switch mechanism in said drum indexing device and another cam-operated switch mechanism in said control circuit for energizing said indexing device, another electric motor in said control circuit including a cam-operated switch mechanism for energizing and deenergizing the same, movable cams for actuating said switch mechanisms, the cams for actuating the switch mechanisms which are in circuit with said motor through said indexing device being moved by said motor when energized, the cams for actuating the switch mechanisms in circuit with said motor through said timing device and the switch mechanisms for energizing said indexing device and for controlling said another motor being moved by said another motor, and a switch mechanism in circuit with said timing device and said another motor and actuated by the former after a time interval as determined by said timing device for energizing said another motor and thus causing movement of the cams driven thereby for energizing said indexing device and thus causing deenergization of said drum rotating motor by a cam driven by the latter actuating a predetermined switch mechanism in said indexing device.

9. In a tire building machine, the combination of a rotary tire building drum, and a control circuit therefor connected with an energy source and operative to rotate said drum upon lapse of a predetermined time interval, said control circuit comprising an electric motor for rotating said drum, a first cam-operated switch mechanism in circuit with said motor for energizing the latter, an electronic timing device in said circuit and including a plurality of cam-operated switch mechanisms, movable cams for actuating said switch mechanisms, means in said control circuit for moving said cams, and another switch mechanism in circuit with said means and actuated by one of said cams to successively energize and deenergize said means, a relay functionally responsive to current flow through said timing device and in circuit with said means for energizing the latter independently of said another switch mechanism, and means in said control circuit in circuit with said timing device adjustable to regulate the time interval after deenergization of said first means by said another switch mechanism before the current flow through said timing device builds up to energize said relay, said motor being deenergized through said first switch mechanism in the time interval between deenergization and energization of said first means as aforesaid and energized through said first switch mechanism by movement of the cams effected by energization of said first means through said relay.

10. In a tire building machine, the combination of a rotary tire building drum and a control circuit therefor connected with an energy source and operative to predeterminedly rotate said drum following application of stock thereonto, said control circuit comprising an electric motor for rotating said drum, an energizable drum indexing device driven by said motor, a switch mechanism in said device in circuit with said motor for controlling the latter, a cam driven by said motor for actuating said switch mechanism upon energization of said device and thereby deenergizing said motor at a position corresponding to a desired position of said drum, another electric motor in said control circuit, a pair of cam operated switch mechanisms respectively in circuit with said device and with said motor through said first switch mechanism, a pair of cams for actuating said pair of switch mechanisms, said pair of cams being driven by said another motor and disposed to actuate one of such pair of switch mechanisms and thus energize said motor through said first-named switch mechanism and to concurrently actuate the other one of such pair of switch mechanisms and thus energize said device, the cam driven by said motor when the latter is energized as aforesaid actuating said first-named switch mechanism to deenergize said motor and thus stop said drum at a preselected position.

11. In a tire building machine, the combination of a rotary tire building drum, and a control circuit therefor connected with an energy source and operative to stop said drum for a predetermined time interval following wrapping of stock therearound to enable splicing of the stock, said control circuit comprising an electric motor for rotating said drum, an electronic timing device in said circuit, a series of cam-operated switch mechanisms in said circuit, a corresponding series of movable cams for actuating said switch mechanisms, means for driving said cams, one of said series of switch mechanisms being in circuit with said means for deenergizing the latter, another one of said series of switch mechanisms being in circuit with said device and actuated by its cam for energizing the latter concurrently with the deenergization of said means, still another one of said series of switch mechanisms being in circuit with said motor and actuated by its cam for deenergizing said motor at the time when said means is deenergized, a switch mechanism in circuit with said means and actuated by said device upon lapse of a time interval as determined thereby for energizing said means independently of said one of said series of switch mechanisms whereby to move the cam for actuating said still another one of said series of switch mechanisms and thus energize said drum rotating motor.

12. In a tire building machine, the combination with a rotary tire building drum, and a ply turn-down tool movable across one end of said drum for turning down the overhanging marginal edge of stock wrapped around said drum, of control circuits operative to rotate said drum and actuate said tool and respectively connected with an electric energy source and a fluid pressure energy source, said control circuits respectively comprising an electric motor in the fluid pressure circuit for moving said tool as aforesaid, a solenoid operated valve in both circuits controlling supply of working fluid to said fluid motor, an electronic timing device in said electrical circuit for energizing said motor and said valve, switches in said electrical circuit, corresponding movable cams for actuating said switches, another electric motor in said electrical circuit for moving said cams, one of said switches being in circuit with said another motor and actuated by its cam to deenergize said another motor, other of said switches being in circuit with said motor, with the solenoid of said valve, and with said timing device and concurrently actuated by their cams to energize said drum rotating motor and said valve and to set said timing device in operation, energization of the solenoid of said valve as aforesaid actuating said tool through said fluid motor, a switch in circuit with said another motor and with said timing device and actuated by the latter after a predetermined time interval as determined by said device to energize said another motor independently of said one of said switches, said cams being disposed to actuate the first two of said other switches to deenergize said drum rotating motor and said solenoid valve upon energization of said another motor as aforesaid.

13. In a tire building machine, the combination with a rotary tire building drum, and a bead setting ring movable axially toward one end of said drum to set a bead carried by said ring onto previously turned down stock at the end of said drum, of control circuits operative to rotate said drum and actuate said ring and respectively connected with an electric energy source and a fluid pressure energy source, said control circuits respectively comprising an electric motor for rotating said drum, and a fluid pressure actuated motor for actuating said ring, a solenoid operated valve in both circuits controlling supply of working fluid to said fluid motor, an electronic timing device in said electrical circuit for energizing said motor and said valve, switches in said electrical circuit, corresponding movable cams for actuating said switches, another electric motor in said electrical circuit for moving said cams, three of said switches respectively being in circuit with said valve, said another motor and said timing device and actuated by their cams to respectively energize said valve, to deenergize said another motor, and to set said device in operation, a limit switch in circuit with said motor and actuated by said ring to energize said drum rotating motor, said ring having been actuated through said fluid motor upon energization of said valve as aforesaid, a switch in circuit with said timing device and actuated by the latter upon lapse of the predetermined time period as determined by said device to energize said another motor independently of the second of said three switches, the cam for actuating the first of said three switches being disposed to actuate said first of three switches upon energization of said another motor as aforesaid.

14. In a tire building machine, the combination with a rotary tire building drum, and a tool movable toward said drum into engagement with stock thereon and thence axially in opposite directions along said drum, of control circuits for rotating said drum and actuating said tool and respectively connected with an electric energy source and a fluid pressure energy source, said control circuits respectively comprising an electric motor in the electrical circuit for rotating said drum, a fluid pressure operated motor in the fluid pressure circuit for moving said tool toward said drum, a reversible electric motor in said electrical circuit for axially reciprocating said tool, a solenoid operated valve in both circuits for controlling supply of working fluid to said fluid motor, an electronic timing device in said electrical circuit, switches in said electrical circuit, movable cams for actuating said switches, an electric indexing motor in said electrical circuit for moving said cams, and three of said switches respectively being in circuit with said motor, said reversible motor and with the solenoid of said valve and actuated by their cams to respectively energize said drum rotating motor, said reversible motor and said valve, a switch in circuit with said indexing motor concurrently actuated to deenergize said indexing motor, a limit switch in circuit with said reversible motor and actuated by said tool for reversing said reversible motor, and another limit switch also in circuit with said reversible motor and actuated by said tool upon predetermined axial movement in the opposite direction for deenergizing said reversible motor.

15. In a tire building machine, the combination of a rotary tire building drum and drive therefor, tire building tools and actuating means therefor adapted sequentially to perform tire building operations on said drum, and a control for intermittently rotating said drum and actuating said tools, said control comprising an electronic, potentiometer-controlled timing device connected with an electric energy source and in circuit with said drive and actuating means, a series of switches in said device, a series of movable cams for actuating said switches, an electric motor connected with an energy source for moving said cams, an electron tube in said device having a cathode, a grid, and a plate, a condenser and a series of potentiometers in the grid circuit of said tube and respectively in circuit with said switches, a relay coil in the plate circuit of said tube, and a switch in circuit with said motor for energizing said motor and actuated by predetermined current flow in said coil, the time interval for so actuating said last-named switch being controlled by the setting of that potentiometer which is in circuit with a switch actuated by one of said cams.

16. In a tire building machine, the combination with a rotary tire building drum having stock thereon with the overhanging marginal edge turned down over one end of said drum and a bead set against such turned down stock, and a turn up tool for turning the stock around the bead, of control circuits for rotating said drum and actuating said tool and respectively connected with electrical and fluid pressure energy sources, said control comprising an electric motor in said electrical circuit for rotating said drum, a reversible electric motor also in said electrical circuit for moving said tool around the bead, a fluid pressure operated motor in said fluid pressure circuit for pressing the tool against the stock while so moving, an electronic timing device in said electrical circuit for energizing said electric motors, switches in said device, movable cams for actuating said switches, an indexing motor in said electrical circuit for moving said cams, a solenoid operated valve in both circuits for controlling supply of working fluid to said fluid motor, one of said switches being in circuit with said indexing motor and actuated by its cam to deenergize said indexing motor, a limit switch in circuit with said reversible motor and operative when tripped to energize said reversible motor, switches in circuit with said indexing motor and solenoid valve and actuated consequent to tripping of said limit switch for respectively blocking out advance of the indexing motor and energizing said solenoid valve, and a limit switch in circuit with said reversible motor and valve tripped by said tool for deenergizing said reversible motor and for deenergizing said fluid motor through said valve.

17. In a tire building machine, the combination with a rotary tire building drum and energizable drive therefor connected with an electric energy source, of an energizable drum indexing device in circuit with said drive for predeterminedly energizing said drive and thus positioning said drum, said device comprising a series of switches, a corresponding series of cams moved by said drive for actuating said switches, and an electronic timing device connected with an energy source for controlling said indexing device, said timing device comprising another series of switches, another corresponding series of cams for actuating said another series of switches, and an electric motor connected with an energy source for moving said latter cams, two switches of said another series adapted to be concurrently actuated by their cams and in circuit with said motor and timing device to deenergize said motor, and to set said timing device in operation, respectively, a switch in circuit with said motor and actuated by said timing device upon lapse of a predetermined time interval for energizing said motor, another of the switches of said another series being in circuit with said indexing device and actuated by its cam for energizing said indexing device, such energization of said indexing device causing actuation of one of the switches of said series of switches by its cam, said last-named switch being in circuit with said drum drive whereby actuation thereof deenergizes said drive.

18. In a tire building machine, the combination with a rotary tire building drum and drive therefor connected with an energy source, and tire building tools and actuating means therefor also connected with an energy source adapted to successively perform tire building operations on stock wrapped on said drum, of a control circuit connected with an energy source for energizing and deenergizing the drive for said drum comprising an indexing device in said circuit including switches in circuit with said drive operative to stop said drum at predetermined positions, and in circuit with said tool actuating means for sequentially energizing and deenergizing said actuating means at predetermined intervals, and an electronic timing device connected with an energy source and comprising an electron tube having a cathode, a plate, and a grid, a potentiometer and condenser in the grid circuit of said tube to control the grid bias thereof, a relay coil in the plate circuit of said tube, and a switch actuated by predetermined flow of current through said coil to energize said indexing device whereby to actuate said switches therein.

19. In a tire building machine, the combination of a rotary tire building drum and drive therefor connected with an energy source, tire building tools and actuating means therefor also connected with an energy source and adapted sequentially to perform tire building operations on said drum, and a control circuit for intermittently rotating said drum and actuating said tools, said control circuit comprising an electronic timing device connected with an energy source and in circuit with said drive and actuating means, a switch in circuit with said timing device for selectively rendering said timing device operative and inoperative, and a manual switch interposed in said control circuit bypassing said timing device and in circuit with said drive and actuating means for performing the successive tire building operations upon each actuation of said manual switch and at intervals in accordance with the intervals between actuations of said manual switch.

20. In a tire building machine, the combination with a plurality of electrically responsive power units connected to an energy source and a corresponding number of switch mechanisms in circuit with the respective units for controlling energization and deenergization of the latter, of a control circuit for said units connected to an energy source, a program controlling timer in said control circuit adapted to be periodically energized to actuate said switch mechanisms in desired sequence, said program controlling timer comprising a relay in circuit therewith and functionally responsive to current flow in said control circuit for energizing said timer, and plural means in said circuit individually adjustable to regulate the time interval before the current through said relay builds up to a predetermined value, and means in said timer selectively establishing a circuit between said plural means and said relay whereby, upon lapse of a time period as determined by the selected plural means, said relay energizes said timer to actuate said switch mechanisms.

21. In a tire building machine, the combination with a plurality of electrically responsive power units connected to an energy source and a corresponding number of switch mechanisms in circuit with the respective units for controlling energization and deenergization of the latter, of a control circuit for said units connected to an energy source, a program controlling timer in said control circuit adapted to be periodically energized to actuate said switch mechanisms in desired sequence, said program controlling timer comprising a relay in circuit therewith and functionally responsive to current flow in said control circuit for energizing said timer, and plural means in said circuit individually adjustable to regulate the time interval before the current through said relay builds up to a predetermined value, and means in said timer selectively establishing a circuit between said plural means and said relay whereby, upon lapse of a time period as determined by the selected plural means, said relay energizes said timer to actuate said switch mechanisms, said plural means comprising potentiometers, and a condenser connected in parallel with said potentiometers.

22. In a tire building machine, the combination with a plurality of electrically responsive power units connected to an energy source and a corresponding number of switch mechanisms in circuit with the respective units for controlling energization and deenergization of the latter, of a control circuit for said units connected to an energy source, a program controlling timer in said control circuit adapted to be periodically energized to actuate said switch mechanisms in desired sequence, said program controlling timer comprising a relay in circuit therewith and functionally responsive to current flow in said control circuit for energizing said timer, a vacuum tube having an anode and cathode in circuit with said relay, and a grid, a condenser in the grid circuit of said tube, and a plurality of potentiometers connected in parallel to said condenser, said potentiometers being individually adjustable to regulate the time interval before the current through said tube and relay builds up to a predetermined value, and means in said timer selectively establishing a circuit between one of said potentiometers and said relay whereby, upon lapse of a time period as determined by the selected potentiometer, said relay energizes said timer to actuate said switch mechanisms.

23. In a tire building machine, the combination with a plurality of electrically responsive power units connected to an energy source and a corresponding number of switches in circuit with the respective units for controlling energization and deenergization of the latter, of an indexable switch operating mechanism and driving means therefore arranged to actuate different ones of said switches at each indexed position whereby to energize said power units in desired sequence, and a control circuit for periodically energizing said driving means to index said mechanism from one position to the next including a plurality of current regulating devices arranged so that different ones thereof are included in the circuit at each indexed position of said mechanism, and means included in the circuit with said current regulating devices effective to control the lapse of time, in relation to the setting of the current regulating device in the circuit, until said driving means is again energized to index said mechanism to the next position.

THOMAS C. JONES.

REFERENCES CITED

The following references are of record in the file of this patent:

UNITED STATES PATENTS

| Number | Name | Date |
| --- | --- | --- |
| 1,347,305 | Taylor | July 20, 1920 |
| 2,040,425 | Biach | May 12, 1936 |
| 2,250,847 | Torkelson | July 29, 1941 |
| 2,290,626 | Bosomworth | July 21, 1942 |
| 2,313,035 | Breth | Mar. 9, 1943 |
| 2,394,464 | McChesney | Feb. 5, 1946 |
| 2,427,207 | Grieveson | Sept. 9, 1947 |
| 2,432,581 | Miller | Dec. 16, 1947 |
| 2,443,660 | Large | June 22, 1948 |
| 2,454,168 | Hartwig | Nov. 16, 1948 |
| 2,457,112 | Abercrombie | Dec. 28, 1948 |
| 2,463,318 | Schneider et al. | Mar. 1, 1949 |
| 2,464,020 | Breth | Mar. 8, 1949 |
| 2,480,678 | Skudre | Aug. 30, 1949 |